(12) United States Patent
Ingrassia et al.

(10) Patent No.: US 9,147,272 B2
(45) Date of Patent: Sep. 29, 2015

(54) METHODS AND SYSTEMS FOR PROVIDING MAPPING, DATA MANAGEMENT, AND ANALYSIS

(76) Inventors: Christopher Allen Ingrassia, Arlington, VA (US); Pramukta Satya Kumar, Bethesda, MD (US); Sean Gorman, Washington, DC (US)

( * ) Notice: Subject to any disclaimer, the term of this patent is extended or adjusted under 35 U.S.C. 154(b) by 1798 days.

(21) Appl. No.: 11/898,198

(22) Filed: Sep. 10, 2007

(65) Prior Publication Data
US 2008/0091757 A1 Apr. 17, 2008

Related U.S. Application Data

(60) Provisional application No. 60/824,913, filed on Sep. 8, 2006.

(51) Int. Cl.
*G09G 5/02* (2006.01)
*G06T 11/20* (2006.01)
(Continued)

(52) U.S. Cl.
CPC .......... *G06T 11/206* (2013.01); *G06F 17/3087* (2013.01); *G06F 17/30241* (2013.01);
(Continued)

(58) Field of Classification Search
CPC ..... G06T 15/40; G06T 15/405; G06T 11/206; G06T 7/0028; G06T 17/05; G06T 2207/10032; G06T 11/001; G06F 17/30241; G06F 17/3087; G06F 7/0028; H04L 41/22
USPC ......... 345/422, 581, 603, 589, 593, 591, 605, 345/597; 703/2; 701/211, 532; 382/191, 382/293, 284, 128; 358/1.9
See application file for complete search history.

(56) References Cited

U.S. PATENT DOCUMENTS 5,355,442 A 10/1994 Paglieroni et al.
5,781,704 A 7/1998 Rossmo
(Continued)

FOREIGN PATENT DOCUMENTS

JP 2001-222613 8/2001
JP 2001-229186 8/2001
(Continued)

OTHER PUBLICATIONS

Ickjai Lee et al., "Polygonization of Point Clusters Through Cluster Boundary Extraction for Geographical Data Mining", Symposium on Geospatial Theory, Processing and Applications (2002) (14 Pages).
(Continued)

*Primary Examiner* — Jin-Cheng Wang
(74) *Attorney, Agent, or Firm* — DLA Piper LLP US

(57) ABSTRACT

A computerized method for providing mapping, data management, and analysis. A user request for creation of a map with a desired Gaussian aggregation and desired color map parameters is received. Vector geographic data is loaded at the server. The vector geographic data comprises location data, and the location data comprises an attribute. The vector geographic data is rasterized to create image data composed of pixels. The image data is converted to a certain scale grayscale image data. A convolution operation is performed on the grayscale image data to provide an aggregation of the data using a kernel radius, wherein the kernel radius is adjusted in accordance with the desired zoom level. Convolution results are applied to a color ramp; the map for the location data is created based on the color ramp and the convolution results, and the map is provided to the user.

32 Claims, 17 Drawing Sheets
(9 of 17 Drawing Sheet(s) Filed in Color)

(51) Int. Cl.
  *G06F 17/30*  (2006.01)
  *G06T 17/05*  (2011.01)
  *H04L 12/24*  (2006.01)
  *G06T 11/00*  (2006.01)
  *G06T 7/00*  (2006.01)

(52) U.S. Cl.
  CPC .............. *G06T11/001* (2013.01); *G06T 17/05* (2013.01); *H04L 41/22* (2013.01); *G06T 7/0028* (2013.01); *G06T 2207/10032* (2013.01)

(56) References Cited

U.S. PATENT DOCUMENTS

| | | | |
|---|---|---|---|
| 6,084,989 A * | 7/2000 | Eppler | 382/293 |
| 6,421,668 B1 | 7/2002 | Yakhini et al. | |
| 6,424,933 B1 * | 7/2002 | Agrawala et al. | 703/2 |
| 6,535,227 B1 | 3/2003 | Fox et al. | |
| 6,804,394 B1 | 10/2004 | Hsu | |
| 6,868,421 B1 | 3/2005 | Lin | |
| 6,907,392 B2 | 6/2005 | Bennis et al. | |
| 6,915,211 B2 | 7/2005 | Kram | |
| 6,952,661 B2 * | 10/2005 | Agrawala et al. | 703/2 |
| 6,985,929 B1 | 1/2006 | Wilson et al. | |
| 7,035,933 B2 | 4/2006 | O'Neal et al. | |
| 7,062,084 B2 | 6/2006 | Messing et al. | |
| 7,120,620 B2 | 10/2006 | Dumas | |
| 7,152,105 B2 | 12/2006 | McClure et al. | |
| 7,177,882 B2 | 2/2007 | Xie | |
| 7,180,516 B2 | 2/2007 | Kapler | |
| 7,181,406 B1 | 2/2007 | Modest | |
| 7,212,670 B1 * | 5/2007 | Rousselle et al. | 382/173 |
| 7,330,787 B2 * | 2/2008 | Agrawala et al. | 701/532 |
| 7,400,770 B2 * | 7/2008 | Keaton et al. | 382/191 |
| 7,467,147 B2 | 12/2008 | Irish et al. | |
| 7,529,195 B2 | 5/2009 | Gorman | |
| 7,664,298 B2 * | 2/2010 | Lang et al. | 382/128 |
| 7,778,808 B2 | 8/2010 | Miller et al. | |
| 7,822,426 B1 | 10/2010 | Wuersch | |
| 7,965,902 B1 * | 6/2011 | Zelinka et al. | 382/284 |
| 7,983,474 B2 | 7/2011 | Van Workum et al. | |
| 8,018,458 B2 | 9/2011 | Peterson | |
| 8,060,582 B2 | 11/2011 | Bliss et al. | |
| 8,160,893 B2 | 4/2012 | Cardno | |
| 2001/0048435 A1 | 12/2001 | Deering et al. | |
| 2002/0072993 A1 | 6/2002 | Sandus et al. | |
| 2002/0112232 A1 | 8/2002 | Ream et al. | |
| 2002/0112237 A1 | 8/2002 | Kelts | |
| 2003/0061211 A1 | 3/2003 | Shultz et al. | |
| 2003/0090485 A1 * | 5/2003 | Snuffer | 345/422 |
| 2003/0197877 A1 * | 10/2003 | Lee | 358/1.9 |
| 2003/0231174 A1 | 12/2003 | Matusik et al. | |
| 2004/0239681 A1 * | 12/2004 | Robotham et al. | 345/581 |
| 2004/0260510 A1 | 12/2004 | Du | |
| 2005/0033742 A1 | 2/2005 | Kamvar | |
| 2005/0100220 A1 * | 5/2005 | Keaton et al. | 382/191 |
| 2005/0187711 A1 * | 8/2005 | Agrawala et al. | 701/211 |
| 2005/0193430 A1 | 9/2005 | Cohen et al. | |
| 2005/0201405 A1 | 9/2005 | Liu | |
| 2005/0278386 A1 | 12/2005 | Kelly et al. | |
| 2005/0283528 A1 | 12/2005 | O'Neal et al. | |
| 2006/0026170 A1 | 2/2006 | Kreitler et al. | |
| 2006/0078205 A1 | 4/2006 | Porikli et al. | |
| 2006/0085419 A1 | 4/2006 | Rosen | |
| 2006/0129538 A1 | 6/2006 | Baader et al. | |
| 2006/0136127 A1 | 6/2006 | Coch et al. | |
| 2006/0229058 A1 | 10/2006 | Rosenberg | |
| 2006/0241860 A1 | 10/2006 | Kimchi | |
| 2006/0271281 A1 | 11/2006 | Ahn | |
| 2007/0168370 A1 | 7/2007 | Hardy | |
| 2007/0171716 A1 | 7/2007 | Wright et al. | |
| 2007/0218900 A1 | 9/2007 | Abhyanker | |
| 2007/0263007 A1 * | 11/2007 | Robotham et al. | 345/581 |
| 2007/0291994 A1 * | 12/2007 | Kelle et al. | 382/110 |
| 2008/0016472 A1 | 1/2008 | Rohlf | |
| 2008/0086464 A1 | 4/2008 | Enga | |
| 2008/0259815 A1 | 10/2008 | Gorman | |
| 2008/0294678 A1 | 11/2008 | Gorman | |
| 2009/0132469 A1 | 5/2009 | White et al. | |
| 2009/0238100 A1 | 9/2009 | Gorman | |
| 2010/0085350 A1 | 4/2010 | Mishra et al. | |
| 2011/0191284 A1 | 8/2011 | Dalton | |
| 2011/0316854 A1 | 12/2011 | Vandrovec | |

FOREIGN PATENT DOCUMENTS

| | | |
|---|---|---|
| JP | 2003-523030 | 7/2003 |
| WO | WO 00/70463 | 11/2000 |
| WO | WO 01/59989 | 8/2001 |
| WO | WO 2009/137126 | 11/2009 |

OTHER PUBLICATIONS

Shashi Shekhar et al., "Spatial Contextual Classification and Prediction Models for Mining Geospatial Data", IEEE Transactions on Multimedia, vol. 4, No. 2, pp. 174-188 (Jun. 2002).

Christopher Torpelund-Bruin et al., "Segmentation and Mapping of User-Driven Geospatial Web Data", 2010 6th International Conference on Advanced Information Management and Service (IMS), pp. 73-77 (2010).

File History of U.S. Appl. No. 10/902,283.

File History of U.S. Appl. No. 10/902,416.

M.J. Egenhofer, H. T. Bruns, "Visual Map Algebra: A Direct-Manipulation User Interface for GIS", *Proc. 3th IFIP 2.6 workingconference on visual database systems* (IFIP'95), Lausanne, Switzerland, Mar. 27-29, 1995, S. Spaccapietra, R. Jain (eds.), *Visual Database Systems 3, Visual Information Management*, IFIP Conference Proceedings 34 Chapman & Hall, pp. 235-253, 1995.

Bruns, H.T. and Egenhofer, M.J., *User Interfaces for Map Algebra*, Journal of the Urban and Regional Information Systems Association, vol. 9, No. 1, pp. 44-54, 1997.

D. Pullar, "MapScript: A Map Algebra Programming Language Incorporating Neighborhood Analysis," *Geonformatica*, vol. 5, pp. 145-163, 2001.

International Search Report issued in Application No. PCT/US07/077985 mailed Mar. 12, 2008.

John D. Nystuen et al., "A Graph Theory Interpretaton of Nodal Regions", Papers and Proceedings of the Regional Science Association, vol. 7, pp. 29-42 (1961).

European Search Report issued in EP 07 84 2124, dated Jul. 8, 2011.

Markus Neteler et al., "Open Source GIS: A Grass GIS Approach: Second Edition", Kluwer Academic Publishers, Boston, pp. 54-130, 151-183, and 234-239 (2004).

Andrew Nelson, "Analysing Data Across Geographic Scales in Honduras: Detecting Levels of Organisation Within Systems", Agriculture, Ecosystems and Environment, vol. 85, pp. 107-131 (2001).

Notice of Allowance of U.S. Appl. No. 10/902,416, mailed Mar. 5, 2010.

U.S. Appl. No. 10/902,416, filed Jul. 30, 2004.

U.S. Appl. No. 12/791,320, filed Jun. 1, 2010.

U.S. Appl. No. 13/777,124, filed Feb. 26, 2013.

Cohen et al. "Breakdown of the Internet under intentional attack", Physical Review Letters, vol. 86, pp. 16 (2001).

File History of U.S. Appl. No. 12/411,958.

Adamic, L, 2000, "Zipf, Power-laws, and Pareto—a ranking tutorial" *Internet Ecologies Area—Parc Xerox* http://ginger.hpl.hp.com/shl/papers/ranking/ranking.html.

Albert R, Jeong H, Barabasi A, 1999, "The diameter of the World Wide Web" *Nature* 401: 130-131.

Albert R, Barabasi A, 2000, "Topology of evolving networks: Local Events and Universality" *Physical Review Letters* 85: (24) 5234-5237.

Albert R, Barabási, A, 2002, "Statistical mechanics of complex networks" *Reviews of Modern Physics* 74: 47-97.

Amaral L, Scala A, Barthelemy M, Stanley H, 2000, "Classes of small-world networks" *Proceedings of the National Academy of Sciences* 97 (21): 11149-11152.

Arthur WB, 1999, "Complexity and the economy" *Science* 284: 107-109.

(56) References Cited

OTHER PUBLICATIONS

Barabasi A, 2002, *Linked: The New Science of Network.* (Perseus Publishing, New York, NY).
Barabasi A, 2001, "The physics of the Web" *Physics World* Jul. 2001 http://www.physicsweb.org/article/world/14/7/09.
Barabasi A, Albert A, 1999, "Emergence of scaling in random networks" *Science*, Oct. 21, 1999.
Batty M, 2001, "Editorial: Cities as small worlds" *Environment and Planning B: Planning and Design* 28: 637-638.
Beaverstock JV, Smith RG, Taylor PJ, 2000, "World-city network: a new metageography?" *Annals of the Association of American Geographer* 90: 123-134 http://www.jstor.org/pss/1515383.
Bollobás B, 1985, *Random Graphs.* (Academic Press, New York).
Borgatti SP, Everett MG, Freeman LC, 2002, Ucinet for Windows: Software for Social Network Analysis. Harvard: Analytic Technologies http://www.analytictech.com/ucinet/ucinet_5_description.htm.
Cahn RS, 1999, *Wide Area Networks: Concepts and Tools for Optimization.* (San Francisco, CA: Morgan Kaufmann Publishers Inc.).
Caida (1998) "Mapnet: Macroscopic Internet Visualization and Measurement" *CAIDA* http://www.caida.org/tools/visualization/mapnet/.
Chen Q, Hyunseok C, Govindan R, Sugih J, Schenker S, Willinger W, "The origin of power laws in Internet topologies revisited," *Proceedings of IEEE Infocom 2002.*
Junho H. Choi et al., "Comparing World City Networks: A Network Analysis of Internet Backbone and Air Transport intercity Linkages", Global Networks, vol. 6, No. 1, pp. 81-99 (2006).
Economist, 2001, "Drowning in glass" *The Economist* Mar. 22nd—http://www.economist.com/business/displayStory.cfm?Story_ID=540709.
Erdos P, Renyi A. 1960, On the evolution of random graphs. *Publication of the Mathematical Institute of the Hungarian Academy of Science* vol. 5 pp. 17-67.
Faloutsos C, Faloutsos P, Faloutsos M, 1999, "On Power-Law Relationships of the Internet Topology", *Computer Communication Review.*
Garrison W, 1968, "Connectivity of the interstate highway system" in Berry B, Marble D, 1968, *Spatial Analysis.* (Englewood Ciiffs, NJ: Prentice Hall) pp. 239-249.
Gilder G, 2000, *Telecosm.* (New York: Free Press, 2000).
Gorman SP, Malecki EJ, 2000, "The networks of the Internet: an analysis of provider networks in the USA" *Telecommunications Policy* 24: 113-134 (2000).
Gorman, SP, Malecki EJ, "Fixed and Fluid: Stability and Change in the Geography of the Internet" *Telecommunications Policy* 26, 389-413 (2002).
Gorman, SP and McIntee A, "Tethered connectivity? The spatial distribution of wireless infrastructure" *Environment and Planning A* 2003, vol. 35, pp. 1157-1171.
Haggett P, Chorley R, 1969, *Network Analysis in Geography.* (New York: St. Martins Press).
Hayes B, 2000a, "Graph theory in practice: Part I" *American Scientist* 88 (01): 9-13 http://www.americanscientist.org/issues/num2/graph-theory-in-practice-part-i/1.
Hayes B, 2000b, "Graph theory in practice: Part II" *American Scientist* 88 (02): 104-109 http://www.americanscientist.org/issues/pub/graph-theory-in-practice-part-ii/1.
Huberman B, Adamic L, 1999, "Growth Dynamics of the World Wide Web" *Nature* 401:131-134.
Kansky K, 1963, *Structure of Transportation Networks: Relationships Between Network Geometry and Regional Characteristics.* (University of Chicago, Department of Geography, Research Papers).
Lakhina, A, Byers, JW, Crovella, M, Matta, I, 2002, "On the Geographic Locations of Internet Resources" http://www.cs.bu.edu/techreports/pdf/2002-015-internetgeography.pdf.
Malecki EJ, 2002, "The Economic Geography of the Internet's Infrastructure," *Economic Geography*, vol. 78, No. 4, pp. 399-424.
Malecki EJ, Gorman SP, "Maybe the death of distance, but not the end of geography: the Internet as a network", in SD Brunn, TR Leinbach, (eds.) *The Worlds of Electronic Commerce.* (New York: John Wiley) pp. 87-105 (2001).
Milgram S, 1977, The small world problem. in *The individual in a Social World: Essays and Experiments*, Milgrim, S, Sabini, J, (Eds) pp. 281-295. Reading, MA: Addison-Wesley.
Moss ML and Townsend A, 2000, "The Internet backbone and the American metropolis" *The Information Society* 16: 35-47.
Paltridge S, 2002, "Internet traffic exchange and the development of end-to-end international telecommunications competition" (OECD: Working Paper).
Radoslavov P, Tangmunarunkit H, Yu H, Govindan R, Schenker S, Estrin D, 2000, "On characterizing network topologies and analyzing their impact on protocol design" *Tech Report* 00-731, University of Southern California, Dept. of CS.
Seidman, S, 1983, "Internal cohesion of LS sets in graphs." *Social Networks* 5:97-107.
Simon HA, Bonini CP, 1958, "The size distribution of business firms" *The American Economic Review* 48: 607-617.
Stoneham, AKM, 1977, "The small-world problem in a spatial context" *Environment and Planning A* 9: 185-195.
Tangmunarunkit H, Govindan R, Jamin S, Schenker S, and Willinger W, 2001, "Network topologies, power laws, and hierarchy" *Tech Report* USC-CS-01-746—http://isi.edu/~hongsuda/pu... USCTech01_746.ps.
Telegeography, 2002, *Packet Geography 2002: Global Internet Statistics and Comments.* Telegeography Inc: 1909 K St., NW Suite 380 Washington, DC 20006 USA http://www.telegeography.com/products/books/pg/index.html.
Townsend A, 2001, "Network cities and the global structure of the Internet" *American Behavioral Scientist* 44 (10): 1697-1716.
Wasserman, S. and Faust, K., 1994, *Social Network Analysis: Methods and Applications* (Cambridge Univ. Press, Cambridge).
Watts DJ, *Small Worlds: The Dynamics of Networks between Order and Randomness* (Princeton University Press, Princeton, NJ) (1999).
Watts, DJ, 2003, *Six Degrees: The Science of a Connected Age* (W.W. Norton, New York, NY).
Yook SH, Jeong H, Barabási AL, 2001, "Modeling the Internet's Large-Scale Topology" http://xxx.lanl.gov/abs/cand-mat/0107417.
Zipf PK, *Human Behavior and the Principle of Least Effort*; Addison-Wesley, Cambridge, MA; pp. 445-516 (1949).
Gao, L., 2001, On inferring autonomous, system relationships in the Internet. *IEEE/ACM Transactions on networking* 9(6): 733.
The White House: *The National Strategy to Secure Cyberspace*, Feb. 2003.
NRC, 2002, *Cybersecurity Today and Tomorrow: Pay Now or Pay Later Washington*, DC: National Academy Press.
NSTAC, 2002, *Network Security/Vulnerability Assessments Task Force Report Washington, DC*: The President's National Security Telecommunications Advisory Committee—http://www.ncs.gov/nstac/NSVATF-Report-(FINAL).htm.
Moore, D., Paxson, V., Savage, S., Colleen, S., Staniford, S., and Weaver, N. 2003, *The spread of the Sapphire/Slammer worm.* CAIDA—http://www.caida.org/outreach/papers/2003/sapphire/sapphire.html.
Magoni, D. and Pansiot, J.J., 2001, Analysis of the Autonomous system network topology. *Proceedings of ACM SIGCOMM '01.*
Callaway, D.S., Newman, M.E.J., Strogatz, S.H., and Watts, D.J., 2000, "Network robustness and fragility; percolation on random graphs.," *Physical Review Letters* 85 (25): 5468-5471.
Gorman, S.P. and Kulkarni, R., Spatial small worlds: New geographic patterns for an information economy. *Environment and Planning B: Planning and Design 2004*, vol. 31, pp. 273-296.
Gorman, S.P., Schintler, L.A., Kulkarni, R.G., and Stough, R.R., *The revenge of distance: Vulnerability analysis of critical information infrastructure.* in submission (2002).
Grubesic, T.H., O'Kelly, M.E., and Murray, A.T., (2003) A geographic perspective on telecommunication network survivability. *Telematics and Informatics* 20(1): 51-69.
Cliff A., Haggett P., and Ord K. Graph theory and geography. In: Wilson R. and Beineke L. (Eds) *Applications of graph theory.* London: Academic Press, pp. 293-326 (1979).

(56) References Cited

OTHER PUBLICATIONS

Lawyer, G., 2003, The battle of the bug: Government, industry move to protect Internet from cyber attacks, viruses. http://www.xchangemag.com/articles/1B1front4.html.

Pastor-Satorras, R., Vespignani, A., 2001, Epidemic dynamics and endemic states in complex networks. *Physical Reviewl* E 63: 066117.

Moreno, Y., Vazquez, A., 2003, *Disease spreading in structured scale free networks*. The European Physical Journal B 31:265-271.

Dezsos, A., Barabasi, A.L., 2002, *Halting viruses in scale-free networks*. Physical Review E 65:055103 (R).

Newman, M.E.J., Forest, S., and Balthrop, J., 2002, Email networks and the spread of computer viruses. *Physical Review* E 66: 035101(R).

Hunker, J., 2002, Policy challenges in building dependability in global infrastructures. *Computers & Security* 21(8): 705-711.

Dinc M., Haynes K.E., Stough R.R., and Yilmaz S., 1998, Regional universal telecommunication service provisions in the US—Efficiency versus penetration. *Telecommunications Policy* 22 (6): 541-553.

Tarjanne, P., 1999, Preparing for the next revolution in telecommunications: implementing the WTO agreements Policy 22(6): 541-553.

Pastor-Satorras, R., and Vespignani, A., 2002, Immunization of complex networks. *Physical Review* E 65:036104-1.

Moore, D., Shannon, C., Voelker, G.M., and Savage, S., 2003,. *Internet quarantine: Requirements for containing self-propagating code*. INFOCOM 2003 http://www.caida.org/outreach/papers/2003/quarantine/.

Atkinson, R. (1998) "Technological Change and Cities.," *Cityscape: A Journal of Policy Development and Research* 3 (3): 129-170.

Bhandari, R. (1999) *Survivable Networks: Algorithms for Diverse Routing*. Boston: Kluwer Academic Press.

Brunn, S D. and Leinbach, T R. (1991) *Collapsing Space & Time: Geographic Aspects of Communication & Information*. New York: Harper Collins Academic.

Cairncross, F. (1997) *The Death of Distance*. Boston: Harvard Business School Press.

Castells, M. (1989) *The Informational City*. Oxford, UK: Blackwell.

Falk, T., Abler, R. (1980) Intercommunications, Distance, and Geographical Theory. *Geografiska Annaler*, Series B, 62: 35-56.

Gillespie, A. and Robins, K. (1989) Geographical Inequalities: The Spatial Bias of the New Communications Technologies. *Journal of Communications* 39 (3): 7-18.

Kunreuther, H., Heal, G. and Orszag, P. (2002), "Interdependent Security: Implications for Homeland Security Policy and Other Areas," *The Brookings Institute*, Policy Brief #108.

Lowe, J. and Moryadas, S. (1975) *The Geography of Movement*. Prospect Heights, IL: Waveland Press.

Malecki, E.J.; The Internet Age: Not the End of Geography, in D. Felsenstein and M.J. Taylor, eds. *Promoting Local Growth: Process, Practice and Policy*. Aldershot: Ashgate, 2001, pp. 227-253.

Malecki, E.J. (2002) The Internet: A preliminary analysis of its evolving economic geography, *Economic Geography*, vol. 78, No. 4, pp. 399-424.

Medina, A. Matta, I., and Byers, J. (2000) On the origin of power-laws in Internet topologies. *ACM Computer Communications Review* 30(2).

Moss, M.L. and Townsend, A. (1997) Tracking the net: using domain names to measure the growth of the Internet in US cities. *Journal of Urban Technology* 4(3): 47-60.

Negroponte, N. (1995) *Being Digital*. New York: Alfred A. Knopf.

Pansiot, J. and Grad, D. (1998) On routes and multicast trees in the Internet. *ACM SIGCOMM Computer Communications Review* 28(1) 41-50.

Paxson, V. (1996) End-to-end routing behavior in the Internet. *Proceedings of the ACM SIGCOMM* 96' Sep. 25-38.

Redner, S. (1998) How popular is your paper? An empirical study of the citation distribution. *European Physical Journal B* 4: 131-134.

Yasin, R.; Gov't to map infrastructure. internetweek.com http://www.internetweek.com/story/INW20011206S0001 (2001).

Schintler, L., Kulkarni, R., Gorman, S.P., and Stough, R.; Power and Packets: A Spatial network Comparison of the US Electric Power Grid and Internet Network, pp. 35-60 (2004).

Amin, M, 2001, "Toward self-healing energy infrastructure systems," *IEEE Computer Applications in Power* 14(1): 20-28.

Berry B, Marble D, 1968, *Spatial Analysis*. Englewood Cliffs, NJ: Prentice Hall.

Christaller, W. (1933) *Central Places in Southern Germany*. Jena, Germany: Fischer (English Translation by C.W. Baskin, London: Prentice Hall, 1966).

Collins J, 2002, "Dominant Cisco grows router market share" *Personal Computer World* http://www.pcw.co.uk/News/1131853.

Elmes G, "The changing geography of electric energy in the United States—Retrospect and prospect" *Geography* 81 (4): 347-360 (1996).

FCC Network Outage Reporting System: User Manual, Nov. 30, 2004.

GAO Jan. 2003, "Critical infrastructure protection: Efforts of the financial services sector to address cyber threats", *Report to the Subcommittee on Domestic Monetary Policy, Technology, and Economic Growth, Committee on Financial Services, House of Representatives*.

Halsne C, 2003, "North Sound 911 Service Repeatedly Targeted" *KIRO TV* http://www.kirotv.com/news/2601577/detail.html.

Huitema C, 1995, *Routing in the Internet* Englewood, CA: Prentice Hall.

Knox PL, Taylor PJ, 1995, *World Cities in a World-System* New York: Cambridge University Press.

Langdale JV, 1989, "The geography of international business telecommunications: The role of leased networks" *Annals of the Association of American Geographers* 79(4): 501-522.

Lerten B, 2003, "Tower saboteur: I was only pointing out flaws" *The Bend Bugle* Nov. 23 http://bend.com/news/ar_view3Far_id3D12260.htm.

Leyshon A, 1996, "Financial exclusion and the shifting boundaries of the financial system" *Environment and Planning A* 28(7): 1150-1156.

Lindstron A, "Tunnel Vision?" Broadbandweek.com http://www.broadbandweek.com/news/010806/010806_news_fiber.htm (2001).

Longcore T, Rees P, 1996, "Information technology and downtown restructuring: The case of New York City's financial district" *Urban Geography* 17: 354-372 Maine PUC, 2003, http://www.state.me.us/mpuc/misctranscripts/2002-43%20080503.htm.

Moss, M. (1998) Technologies and Cities. *Cityscape: A Journal of Policy Development and Research* 3: 107-127.

Neuman P, 1991, "NY area fiber-optic telephone cable severed; extensive effects" *The Risk Digest* 10:75 http://catless.ncl.ac.uk/Risks/10.75html#subj1.

Neuman P, 2000, "Week-long outage after cable cut downs 11,000 phone lines" *The Risk Digest* 20:84 http://catless.ncl.ac.uk/Risks/20.84html#subj6.1.

Neuman R, 2002, "Wall street worries" *U.S. News & World Reports* Sep. 23.

NIST, 1995, *The Impact of the FCC's Open Network Architecture on NS/NP Telecommunications Security* Washington DC: National Institute of Standards and Technology http://csrc.nist.gov/publications/nistpubs/800-11/titleona.html.

Nyusten JD, Dacey MF, 1968, A graph theory interpretation of nodal regions. In Berry B, Marble, D, 1968, *Spatial Analysis* Englewood Cliffs, NJ: Prentice Hall 407-418.

O'Kelly ME, Grubesic TH, (2002) Backbone topology, access, and the commercial Internet, 1997-2000. *Environment and Planning B* 29(4): 533-552.

PSERC, 2003, "Public Utilities Commission of Ohio, sequence of events on Aug. 14, 2003" http://www.pserc.wisc.edu/Ohio_Only_Sequence_of Events.pdf.

Cowie, et al., Impact of the 2003 Blackouts on Internet Communication: Preliminary Report, Nov. 21, 2003 (21 pages).

Taaffe, E.J. and Gauthier, H.L. (1973) *Geography of Transportation*. Englewood Cliffs, NJ: Prentice Hall.

Warf B, 1995, "Telecommunications and the changing geographies of knowledge transmission in the late 20th century" *Urban Studies* 32(2): 361-378.

(56) References Cited

OTHER PUBLICATIONS

Wheeler DC, O'Kelly ME, 1999, "Network topology and city accessibility of the commercial Internet" *Professional Geographer* 51: 327-339.
Malecki, EJ, "Fibre tracks: explaining investment in fibre optic backbones" *Entrepreneurship & Regional Development*, Jan. 16, (2004), 21-39.
Evans-Cowley, J, Malecki, EJ, and McIntee, A 2002, "Planning Responses to Telecom Hotels: What Accounts for Increased Regulation of Co-location Facilities?", *Journal of Urban Technology*, vol. 9, No. 3, pp. 1-18, 2002.
International Search Report issued in Application No. PCT/US2005/026752 mailed Dec. 22, 2006.
Written Opinion issued in Application No. PCT/US2005/026752 mailed Dec. 22, 2006.
International Preliminary Report on Patentability issued in Application No. PCT/US2005/026752 mailed Dec. 22, 2006.
Odlyzko, A.M., "Comments on the Larry Roberts and Caspian Networks Study of Internet Traffic Growth", The Cook Report on the Internet, (2001) pp. 12-15.
Notice of Allowance issued in U.S. Appl. No. 10/902,283 mailed Dec. 30, 2008.
Pallas R. et al.: "A pragmatic approach to debris flow hazard mapping in areas affected by Hurricane Mitch: example from NW Nicaragua", Engineering Geology, Elsevier Science Publishers, Amsterdam, NL. vol. 72, No. 1-2, Mar. 1, 2004, pp. 57-72.
European Search Report issued in Application No. 05777205.5 mailed Dec. 23, 2008.
International Preliminary Report on Patentability issued in Application No. PCT/US07/077985 mailed Mar. 19, 2009.
International Preliminary Report on Patentability issued in Application No. PCT/US08/053727 mailed Aug. 27, 2009.
Supplemental Notice of Allowance issued in U.S. Appl. No. 10/902,283, mailed Feb. 25, 2009.
Notice of Allowance of U.S. Appl. No. 10/902,416, mailed Sep. 24, 2009.
Office Action issued in U.S. Appl. No. 10/902,416 mailed. Dec. 16, 2008.
Tarboton, et al., "Advances in the mapping of flow networks from digital elevation data", Utal Water Research Laboratory, (May 20, 2001).
Pu, et al., "Routing Reliability Analysis of Partially Disjoint Paths", University of Victoria, Victoria, Canada, IEEE PACRIM, vol. 1, 2001.
Gomes, et al., "An Algorithm for Calculating the K Most Reliable Disjoint Paths with a Maximum Number of Arcs", University of Columbia, Portugal, (1998).
Cohen, et al., "Breakdown of the Internet under intentional attack", Phys. Rev. Lett 86, 3682 (2001).
Albert, et al., "Error and attack tolerance of complex networks", Nature 406, 378-382 (2000).
S.H. Yook, H. Jeong, A.L. Barabási, "Modeling the Internet's Large-Scale Topology", Dept. of Physics, University of Notre Dame, Notre Dame, IN 46556, USA, 2001.
Watts, et al., "Collective dynamics of small-world networks", Nature 363:202-204 (1998).
Latora, et al., "Is the Boston sybway a small-world network?", Physica A 314:109-111, (2002).
Lakhina, et al., "On the geographic locations of Internet resources", (2002).
Notice of Allowance issued in U.S. Appl. No. 10/902,283 mailed Jul. 18, 2008.
International Search Report issued in Application No. PCT/US08/053727 mailed Jul. 25, 2008.
Written Opinion issued in Application No. PCT/US07/077985 mailed Mar. 12, 2008.
Written Opinion issued in Application No. PCT/US08/053727 mailed Jul. 25, 2008.
File History of U.S. Appl. No. 12/030,028.
File History of U.S. Appl. No. 12/791,320.
File History of U.S. Appl. No. 13/777,124.
Office Action issued in CA 2,662,939 dated Dec. 16, 2014.
Office Action issued in AU 2013201826 dated Dec. 10, 2014.
English language abstract and translation of JP 2003-523030 published Jul. 29, 2003.
English language abstract and translation of JP 2001-229186 published Aug. 24, 2001.
English language abstract and translation of JP 2001-222613 published Aug. 17, 2001.
File History of U.S. Appl. No. 12/030,028, electronically captured from PAIR on Aug. 7, 2015 for May 7, 2015 to Aug. 7, 2015.

\* cited by examiner

METHODS AND SYSTEMS FOR PROVIDING MAPPING, DATA MANAGEMENT, AND ANALYSIS

This application claims priority to provisional application 60/824,913, filed Sep. 8, 2006, and entitled System and Method for Web Enabled Geo-Analytics and Image Processing, which provisional application is herein incorporated by reference in its entirety.

BRIEF DESCRIPTION OF THE FIGURES

The file of this patent contains at least one drawing executed in color. Copies of this patent with color drawings will be provided by the Patent and Trademark Office upon request and payment of the necessary fee.

DETAILED DESCRIPTION OF EMBODIMENTS

Figure 1:
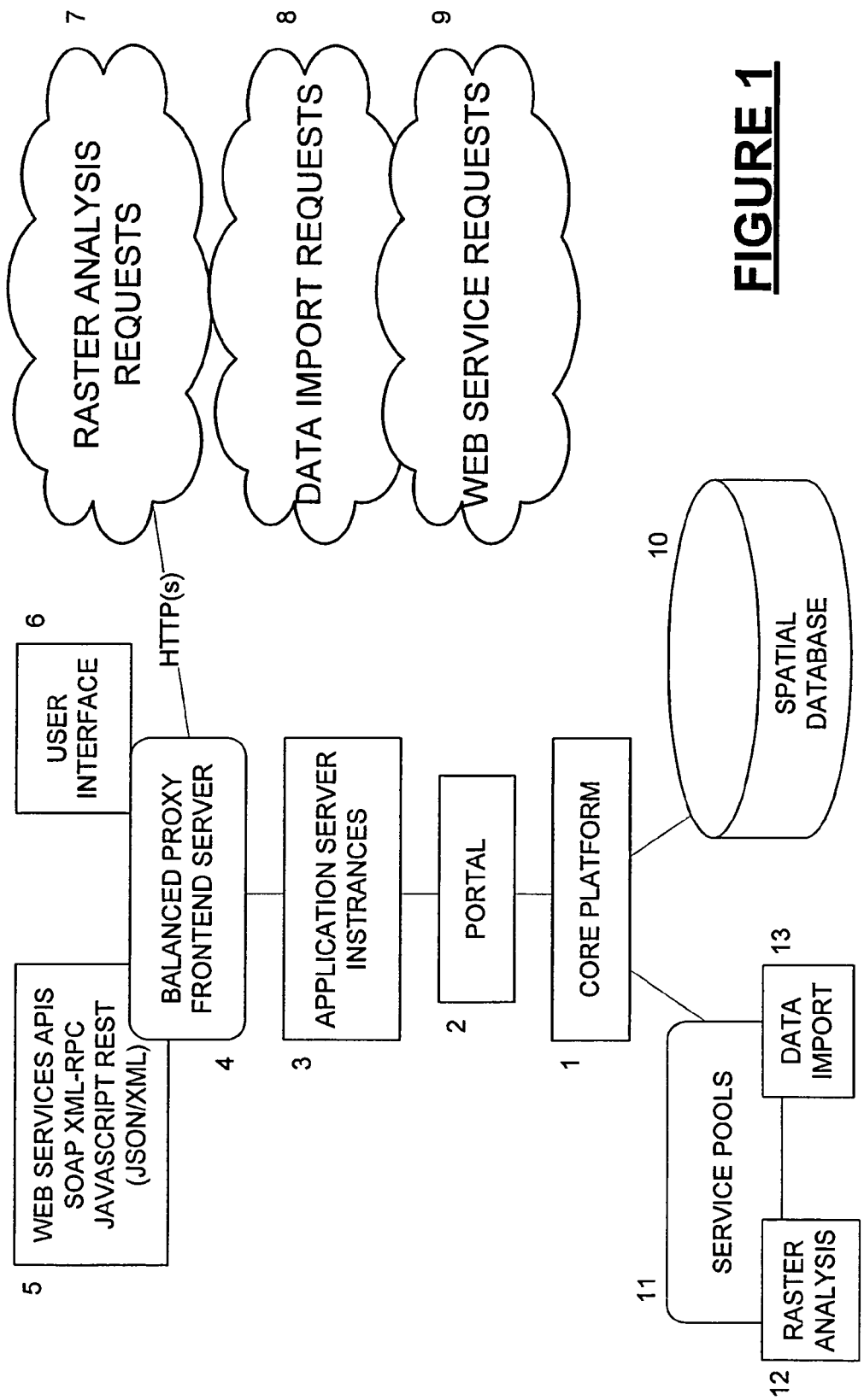
FIG. 1 is a system diagram illustrating a mapping, data management and analysis system 100, according to one embodiment.

FIG. 1 is a system diagram illustrating a mapping, data management and analysis system 100, according to one embodiment. Using the system 100, geo-analytics can be delivered utilizing a Web browser. Geo-analytics performs mathematical computations and/or analysis on geographic information. Geo-analytics delivered using a Web browser can enable entities to utilize geo-spatial applications (i.e., applications which gather, store, process and deliver geographical information) with Web 1.0 or Web 2.0 applications. Web 2.0 applications are applications that use a second generation of Web-based communications and hosted services, and facilitate collaboration and sharing between users.

Figure 2:
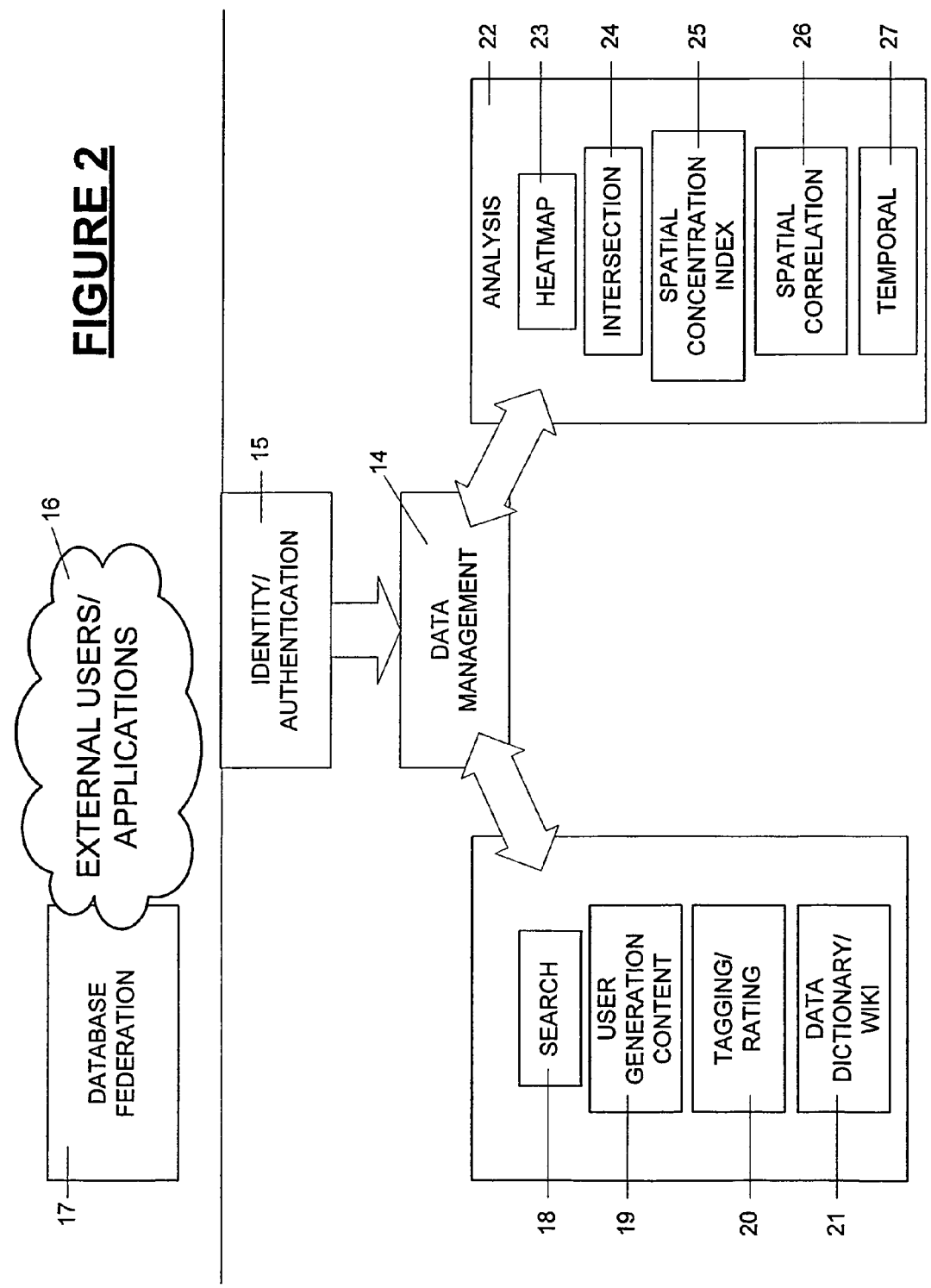
FIG. 2 provides additional details on the core platform 1 of FIG. 1, according to one embodiment.

The system 100 can include a core platform 1 (explained further in FIG. 2 and its accompanying explanation). The core platform 1 can provide many core functions of applications data management, including, but not limited to, data dictionaries/data wikis 21, user generated content 19, search capabilities 18, database federation capabilities 17 (i.e., data pulled from outside system 100), authentication and identification 15, and analysis functions 22 (e.g., heatmap generation 23, intersection analysis 24, spatial concentration indexing (SCI) 25, spatial correlation 26, and temporal analysis 27). The core platform 1 can manage all the data in the system and can link it to analysis modules that serve up results to the system 100. All external data can be loaded through and managed by the core platform 1, and all analysis of that data can be provided by the core platform 1 and delivered to the rest of the system 100. The exposure of the core platform functions to the rest of system 100 can be handled by the portal 2, which can serve as a gateway to the services in the core platform 1. The portal 2 can then be linked to the application server instances 3, which can handle the middleware connecting the core platform 1 to the outside world. The application server instances 3 can be managed by a balanced proxy front end server 4, which can control the flow of traffic from the user interface 6 and Web services 5 (which can communicate using APIs (Application Programming Interfaces), SOAP (Simple Object Access Protocol) XML-RCP (eXtensible Markup Language-Remote Procedure Call), REST (REpresentational State Transfer), Javascript and/or any other technique). The user interface 6 enables a user to access the system 100 and the services it provides. The Web services 5 are the standard means by which a developer can access the services provided by the core platform 1. Through either the user interface 6 or Web services 5, the outside world can interact with the system 100 by sending requests routed through the balanced proxy server 4. These requests can be for raster analysis 7 (including, but not limited to, heatmaps 23, intersection 24, spatial concentration 25, spatial correlation 26, and/or temporal analysis 27). (More detail on the raster analysis requests 7 is provided in FIG. 2 and its accompanying explanation.) The raster analysis request 7 is routed to the core platform 1 which can locate the appropriate dataset from the database 10 for the analysis request and can process that data through the appropriate raster analysis module and then serve up the results using the service pools 11 for raster analysis 12 to create a portable network graphic (PNG) (or other compatible format such as GIFF, TIFF) of the results along with numeric output, if appropriate. Those outside the system 100 can also request to import a data set 8 to the core platform 1 using the service pools 11 for data import 13 that place the data in the spatial database 10. (Details on how the data is managed is provided in FIG. 2 and its accompanying explanation). In addition to requesting analysis and adding data to the system, third party applications can be implemented in the system through Web service requests 9. For instance a third party mapping application can be used to provide a layer in the application for the geo-referenced raster analysis 12, as well as a reference upon which the data in the core platform 1 can be represented. Web service requests 9 are sent through the balanced proxy frontend server 4 to initiate Web services 5.

As pointed out above, the system 100 set forth in FIG. 1 can enable entities to utilize geo-spatial, Web 1.0, and Web 2.0 technologies. Adding geo-analytics to media rich Web applications allows expanded computational and processing abilities. The system 100 can also be used with a variety of applications, including desktop applications and/or Web enabled systems. The analysis that is created can be used for one or more geographic scales. The user can zoom into the image to gain further detail and get an expanded picture of the original raster surface and/or additional detail regarding what specifically is causing the variation in attribute valuation. The user is also able to perform additional analysis using mathematical formulas the add data (e.g., SCI), subtract data (e.g., temporal analysis), multiply data (e.g., intersection), etc.

In addition, a broad, easy to use application can be provided to accommodate a non-technical user base. An understanding of the geo-spatial and mathematical concepts underlying the mapping application is thus not required. Many geo-analytics can be leveraged and simplified from the user's perspective to solve imminent real world problems for this new user set.

In one embodiment, the system 100 can be built with a geo-database back end using MY Structured Query Language (MY SQL) that allows geo-referenced data to be stored and queried. The data can be rated and tagged similar to what is implemented with Flickr (Flickr is an application that can provide photo sharing to consumers). Note that other tagging and rating systems can also be utilized. The tagging and rating system allows data to be to easily managed, pushing the most relevant and accurate data to the top of the hierarchy. The middleware of the application can be developed, in one embodiment, using Ruby on Rails (Ruby on Rails is a middleware development platform that allows rapid building of media rich Web applications), providing a robust architecture for quickly building media rich Web applications to utilize a geo-database. Note that systems other than Ruby on Rails can be utilized. The front end can be developed, in one embodiment, in OpenLaszlo (OpenLaszlo is a middleware development platform that can integrate Macromedia Flash with html and dynamic html in a browser deployable environment without requiring plug-ins to be downloaded). Note that systems other than OpenLaszlo can also be used.

FIG. 2 provides additional details on the core platform 1 of FIG. 1, according to one embodiment. The core platform 1 can provide both the analysis functions and database functions for the system. Data that is loaded into the system can be managed and served through the core platform 1. When data is loaded with the service pools through the portal 2, the user may be asked to provide tags/ratings 20 and a data dictionary of uploaded attributes and/or wiki descriptions 21 for each data set. The uploaded data can be either third party formats that already have attributes and features specified, or they can be user generated content 19 where the user defines the attributes and fills in the feature data for each attribute. These datasets can then be rated by other users of the system based on, for example, their accuracy, usefulness, and/or popularity. The combination of tags/ratings 20 and data dictionaries and/or wiki descriptions 21 provide a set of key words that can searched 18, and the tags/ratings 20 can provide a means by which to rank the search results. Once data is loaded into the system 100, analysis can be performed on it by the analysis modules 22, which are explained in detail below in FIGS. 3-4 and 7-17 and their accompanying explanations. If the user selects a heatmap 23 (explained in more detail in FIGS. 3, 7, and 8 and their accompanying explanations), the analysis can produce a colored map illustrating where there are high number values for the data attribute selected. If the user selects an intersection analysis 24 (explained in more detail in FIGS. 11 and 15 and their accompanying explanations), the analysis can show the location where two data sets intersect each other. If the user selects the spatial concentration analysis 25 (explained in more detail in FIGS. 12 and 16 and their accompanying explanations), the analysis can use integration to illustrate how closely located different data attributes (e.g., infrastructures) are. If the user selects the temporal analysis 27 (explained in more detail in FIGS. 9, 10, and 14 and their accompanying explanations), the analysis can show the difference in values from one time period to another for the same set of data for a selected data attribute. If the user selects the spatial correlation analysis 26 (explained in more detail in FIGS. 13 and 17 and their accompanying explanations), the analysis can show how the data attribute from one data set is related to a data attribute from another data set. As described in FIGS. 3-4 and 7-17, many of these analysis results can be communicated out of the system as a raster image. Accompanying numeric results can be communicated to external users and applications 16 because the raw data can be formatted in a variety of ways (e.g., tabular, unique instance). In addition to data in the core platform 1, the system 100 can use database federation 17 to add data from a third party database that can be analyzed by the analysis modules.

Figure 3:
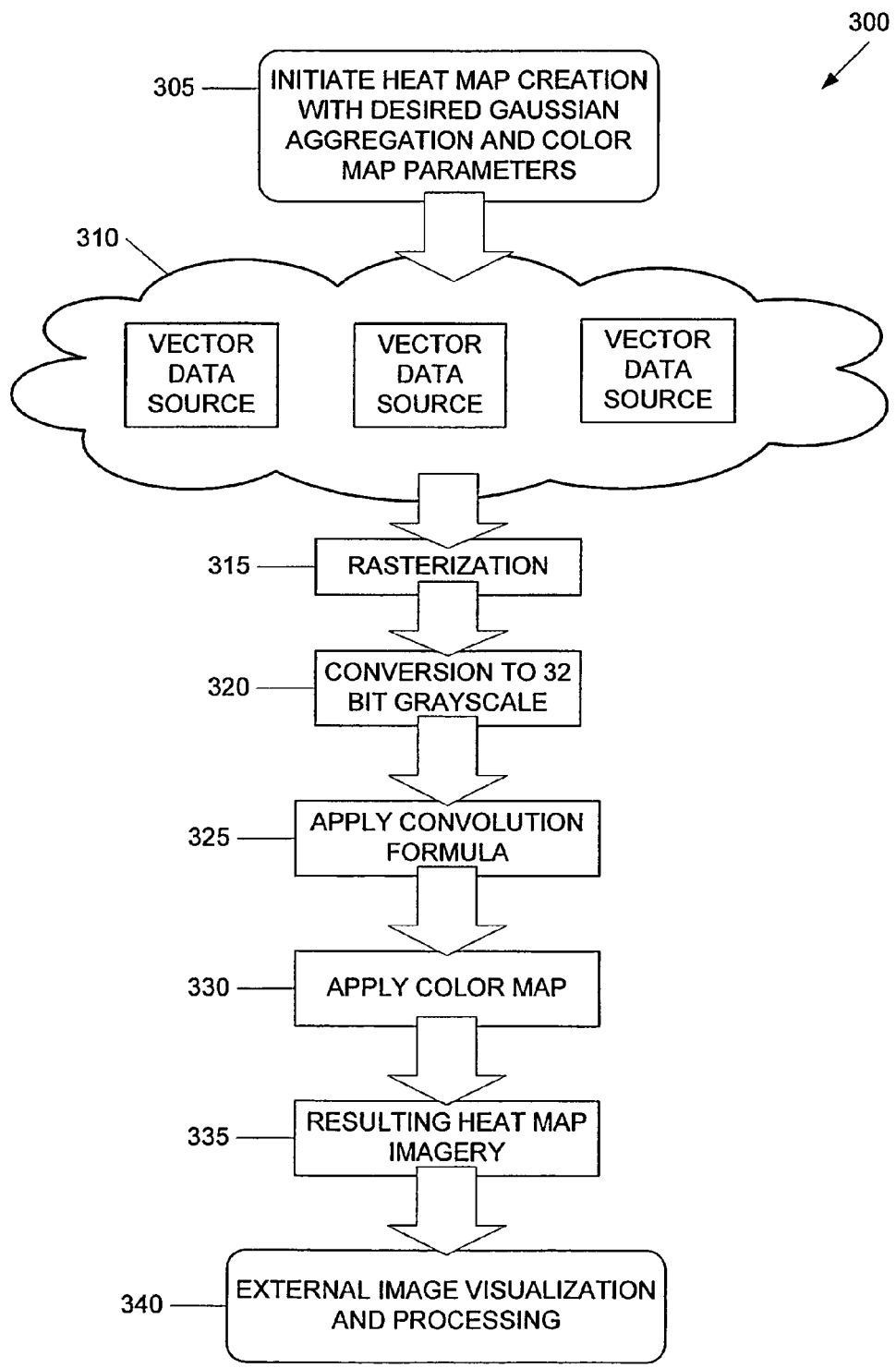
FIGS. 3-4, and 14-17 are workflow diagrams utilizing the mapping, data management, and analysis system 100, according to several embodiments.

FIG. 3 is a workflow diagram 300 utilizing the mapping, data management, and analysis system 100, according to one embodiment. The workflow diagram 300 illustrates how a raster based analysis can be performed which can pertain to any of the analysis functions 22 outlined in FIG. 2 and its accompanying explanation. In 305, heat map creation is initiated with a desired Gaussian aggregation (e.g., search radius) and desired color map parameters. In 310, the desired vector data source is loaded from the data management object 14 in the core platform 1. In 315, the vector data source can be turned into a grid using rasterization. Rasterization is the conversion of images described in terms of mathematical elements (such as points and lines) to equivalent images composed of pixel patterns that can be stored and manipulated as sets of bits. In 320, conversion to a certain scale (e.g., 32 bit grayscale) is performed. Once it is converted, in 325, convolution can be applied to the grid/matrix. Convolution can be applied by taking the grid/matrix and applying a kernel distance decay function. The kernel distance decay function can be based one of many mathematical applications, including, but not limited to, a Gaussian distribution, an exponential formula, a linear formula, a power law formula, a logarithmic formula or a step function formula. The speed at which the kernel distance decay formula is applied can be enhanced by several mathematical applications, including, but not limited to Fourier transformations for convolution, and separable kernels (i.e., if the grid/matrix is one column and one row, when separated, the resulting matrix is expressed as a product of all columns and all rows). In addition, values between attributed data can be interpolated using approaches including, but not limited to, nearest neighbor approach, inverse distance approach, kriging, and splining. In 330, once the convolution operation has been performed on the grid/matrix, the results of the operation can be applied to a color ramp where the color indicates a range of number values resulting from the mathematic operation. In 335, the resulting image can then be created based on the color ramp and mathematical output. In 340, the external visualization and processing can be done to produce a PNG or other suitable graphics interchange format.

Figure 4:
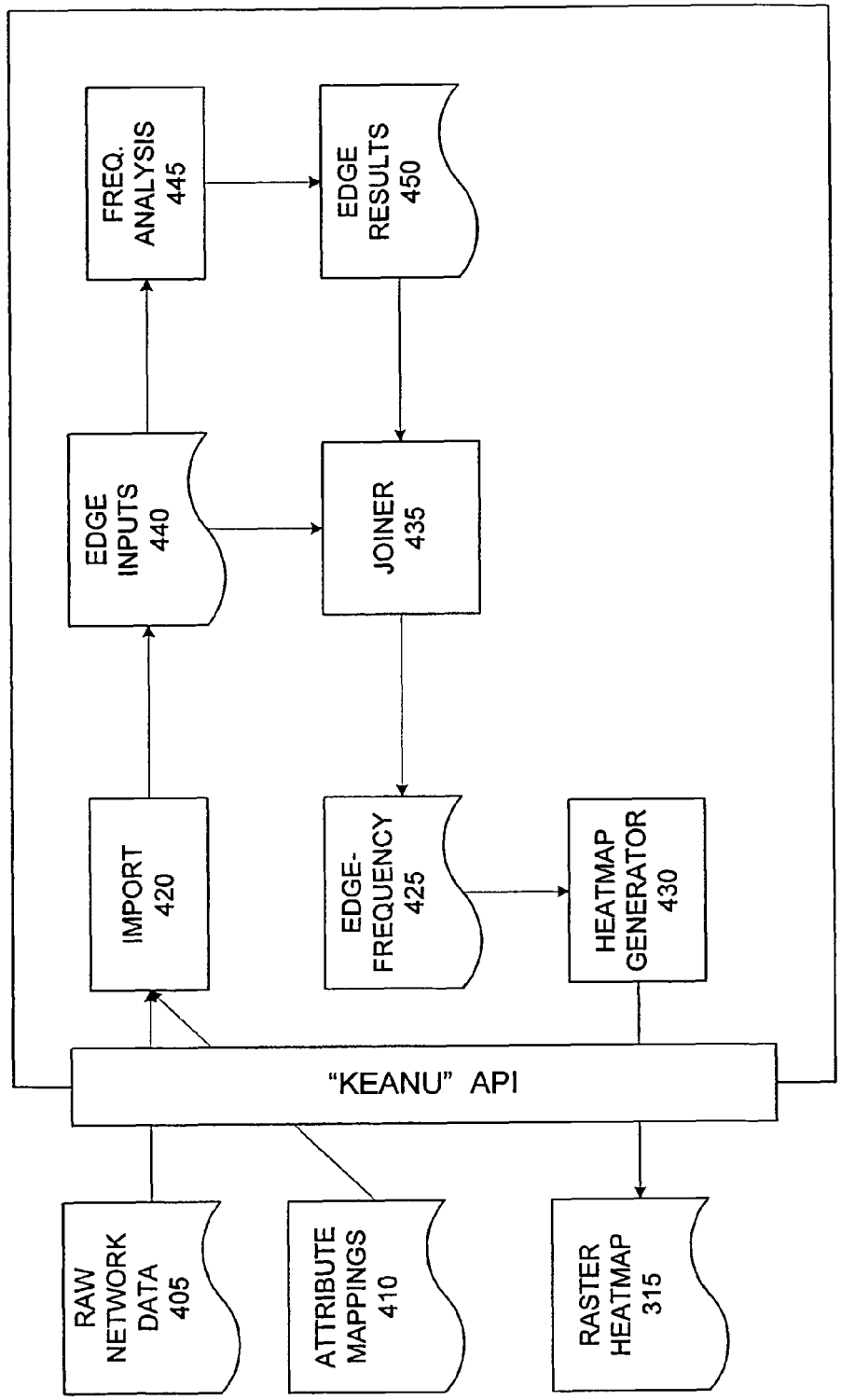

FIG. 4 is a vector density analysis setting forth details of inputting vector data sources 310, according to one embodiment. Example analysis include temporal analysis 27 (using subtraction), intersection analysis 24 (using multiplication), spatial concentration analysis 25 (using addition/integration), and spatial correlation analysis 26 (using a linear correlation coefficient). FIG. 4 illustrates a sample process where output from a network analysis system is integrated. The raw network data 405 is imported 420 as edge inputs 440, which are points that are connected to each other (e.g., edge inputs 440 can be connections between electrical power substations 1, 4, 7, and 8). Each one of these edge inputs 440 can have one or more attributes 410 mapped to it (e.g., attributes of substations can be maximum voltage, number of lines, etc.). Based on the edge inputs 440 and the attributes 410 that are imported, a frequency analysis 445 can be run. In such an analysis, different routes can be run across the network and each time an edge is used it is counted as part of its frequency utilization (e.g., counting how many times edges connecting substations 1, 4, 7, and 8 are used). The edge results 450 of the frequency analysis can then be joined 435 to the original geometry file identifying which edge frequency 425 the result belongs to. The edge frequency is the number of times the edge is used (e.g., how many times the edge connecting 1 and 4 is used). The edge frequency 425 can then be utilized to perform a raster analysis with the heatmap generator 430 and sent out to the system 100 as an raster heatmap image 315.

As pointed out above with respect to FIG. 3, data is entered in 310 that is used to generate the heat map. Many formats can be utilized to allow data (e.g., a geometric location) to be specified and described. It is sometimes useful to allow multiple attributes to be associated with a location or data point. In one embodiment, data structures can be feature attributes, so that quantifiable metrics can be parsed from the data to analyze. This can be done by placing the feature attribute data in the schema tag of any XML based language in a structured way that allows it to be machine parsable. For instance:

```
<Schema name="City" parent="Placemark">
<SimpleField name="Name" type="string" />
<SimpleField name="Population" type="int" />
<SimpleField name="Temperature" type="int" />
<SimpleField name="Crime Rate" type="int" />
</Schema>
<City>
<Name>Nowheretown</Name>
<Population>300</Population>
<Temperature>76</Temperature>
<Crime Rate>25</Crime Rate>
</City>
```

From this code the system knows that geometry is a placemark on the map. That placemark is a city with the name Nowheretown and it has the following attributes—a population of 300, a temperature of 76, and a crime rate of 25. The city has a location and string of attributes that allow analysis to be done by the system.

Figure 5:
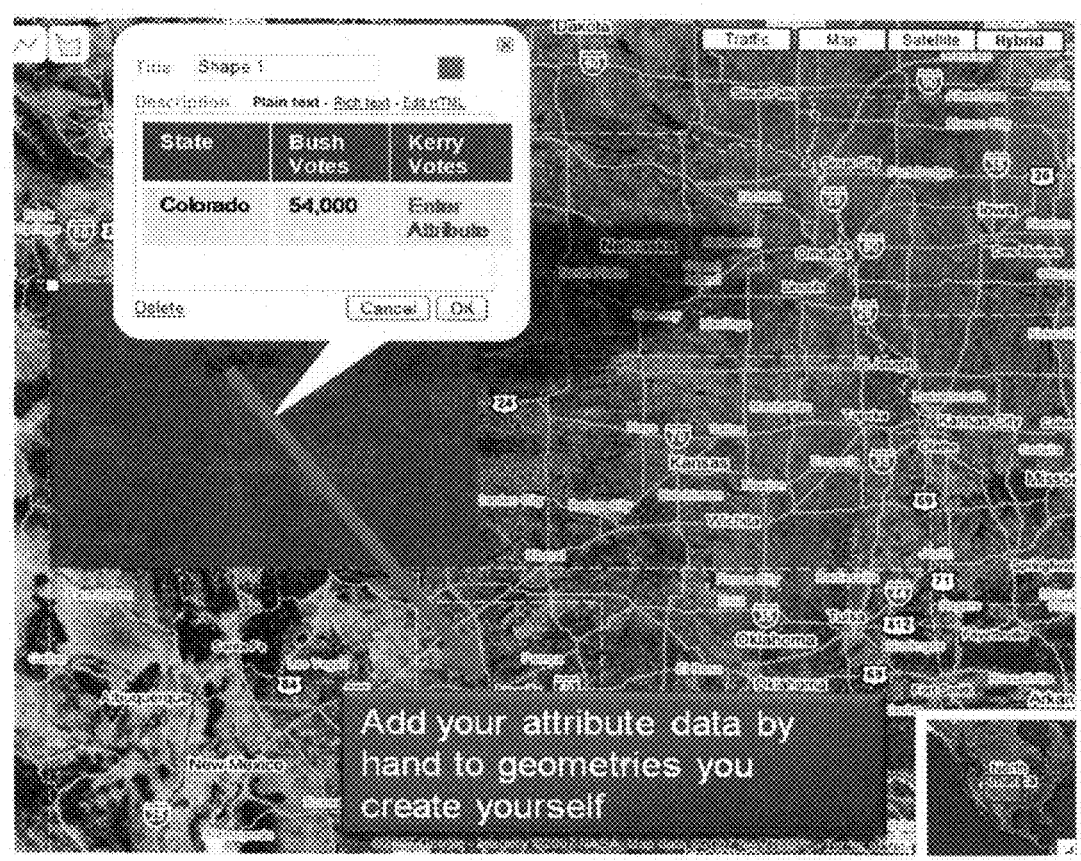
FIGS. 5-6 are examples of how a user may create attribute data, according to several embodiments.

While the above code is useful for a machine to read, in another embodiment, the system 100 allows a user to easily create attribute data to describe the numeric and textual features of a location. The following two methods, for example, can be utilized. For the first method (illustrated in FIG. 5), the user creates fields for the attributes they would like add to a geometry (e.g., point, line, or polygon) or set of geometries. For example, the fields State name, Bush Votes, and Kerry Votes can be created. The user then fills in the fields for each point created on the map.

Figure 6:
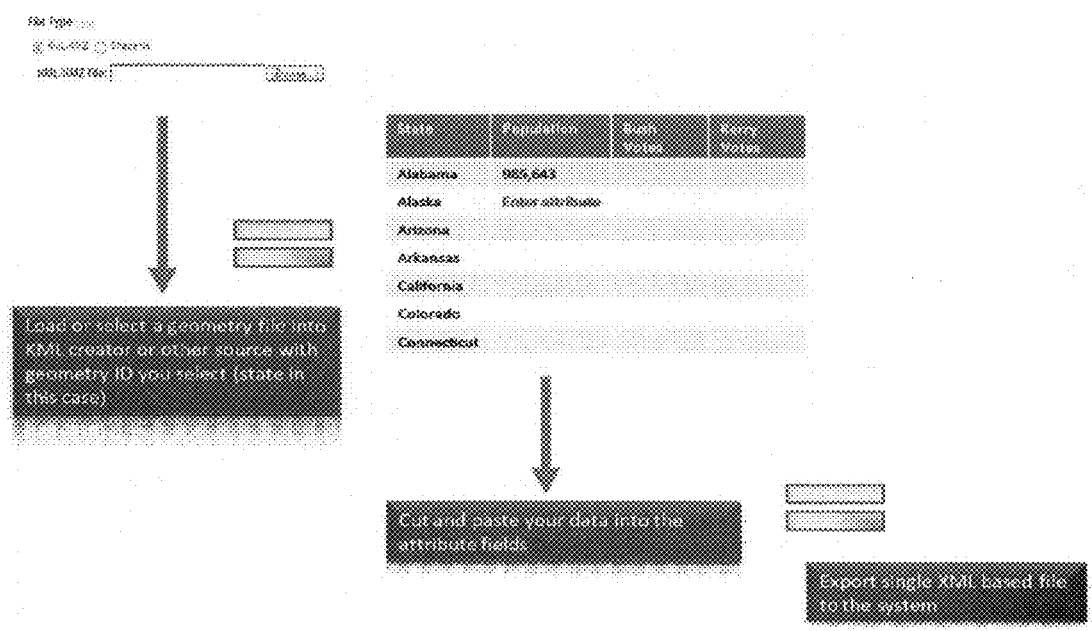

For the second method (illustrated in FIG. 6), the user loads a set of predefined geometries with attributes in an easy spreadsheet interface. The user then selects from a list of predefined geometric boundaries (e.g., countries, states, counties, zip codes, provinces) or they upload a file with geometric boundaries they would like to use as a reference. From the geometric boundary file/selection, the user chooses the field (unique identifier) they would like to join data to (e.g., State name, city Name, FIPS code, identification number etc.). The user then adds the additional fields they would like to supply attribute data for. The user can enter the attributes by hand or cut and paste the attributes from another source.

Similar configuration data from other formats can also be converted to this structure, so that information resident in several systems can be put into a single format that is easily transferable over a network. Once the data is in an open standard single file format that is easily parsable, the data can be easily served up and analyzed in a Web browser environment. The data can be stored in a variety of database configurations and accessed through any number of middleware languages and served to the analytics engine.

Figure 7:
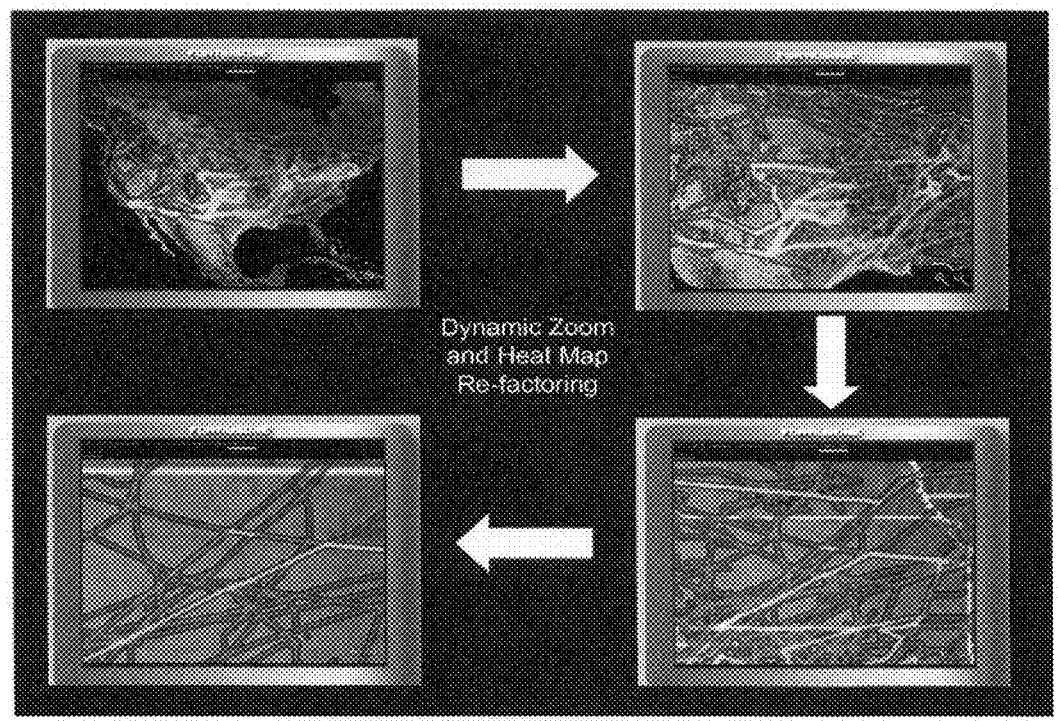
FIGS. 7-13 are examples of different maps, according to several embodiments.

Once the data has been entered in 310, the remainder of the process set forth in FIG. 3 generates a heat map. The heat map can then be dynamically regenerated as the image is zoomed into, panned across, or as the attribute data changes (e.g., the heat map for weather would change as new temperature values were uploaded to the system). For example, a user can zoom to a certain level of specificity or pan across an area by changing the desired Gaussian aggregation in 305 of FIG. 3. An example of the dynamic zooming and/or panning capability is provided in FIG. 7. FIG. 7 illustrates real time pipeline flows in a particular city. One color (such as yellow) can be utilized to indicate the areas of the city where there is the most frequent use of the pipelines. Another color (such as purple) can indicate the areas of the city where there is less frequent user of the pipelines. Zooming can be performed by setting a kernel radius at each geographic level of granularity. When the user zooms in to a level of specificity, the kernel radius is set to match the geographic level of interest or the radius can stay the same and the number of pixels can change due to the size of the window viewed.

Figure 8:
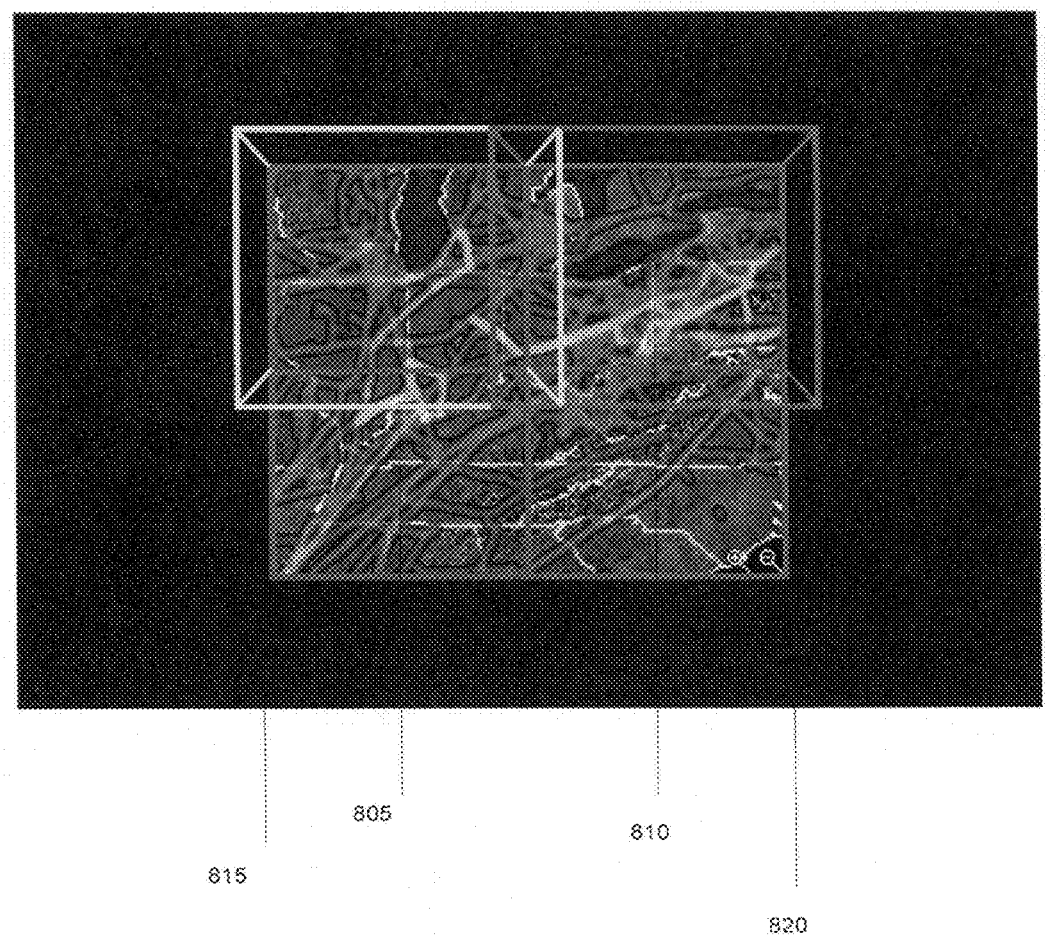

The map can also change based on the original attributes in the data source 310 of FIG. 3 changing. An example of the attribute changing capability is provided in FIG. 8. The addition of buffered bounding boxes allows dynamic rendering and refactoring of heat maps by the user. When the attributes change the pixel valuation determination is run again to produce a new image. The speed at which the image processing occurs can be enhanced by, for example, Fourier transforms for convolution and/or separable kernels. As shown in FIG. 8, an image is given geographic bounding boxes such as 805 (which is illustrated in FIG. 8 by an inside box, which can be green) or 810 (which is illustrated in FIG. 8 by an inside box, which can be green) based on the original coordinates of the attributed data. In addition to the bounding boxes 805 and 810, a buffer 815 (which is illustrated in FIG. 8 by an outside box, which can be yellow) and 820 (which is illustrated in FIG. 8 by an outside box, which can be red) for each box is set based on the Gaussian distance decay function to produce an image outside of the viewing bounding boxes 805 and 810. Thus, when the viewer moves to the next tile or zooms in and out there is a continuous buffer 815 and 820 creating a seamless image. Since the result of the analysis is an image (e.g., PNG, JPEG, TIFF, BITMAP), it can be created as a single overlay onto a variety of geo-referenced maps or surfaces following the process described in FIG. 3. This image can be easily viewed in a Web browser after being sent to a user's Web browser following a request from the user. Each time the user pans, zooms, etc., a new request is sent from the user, and a new image is sent to the user's browser The heat maps can also be analyzed based on applying additional mathematical processes to the method illustrated in FIG. 3, according to several embodiments of the invention. Example analysis include temporal analysis (using subtraction), intersection analysis (using multiplication), special concentration analysis (using addition/integration), and spatial correlation analysis (using a linear correlation function).

Figure 9:
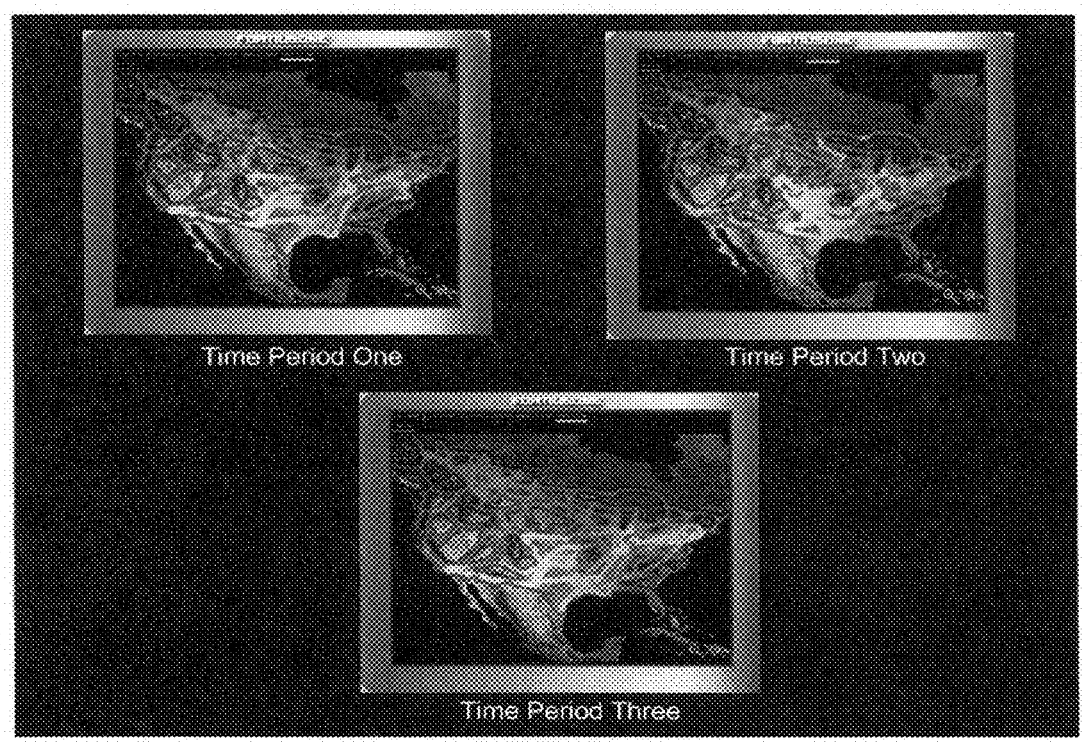
Figure 10:
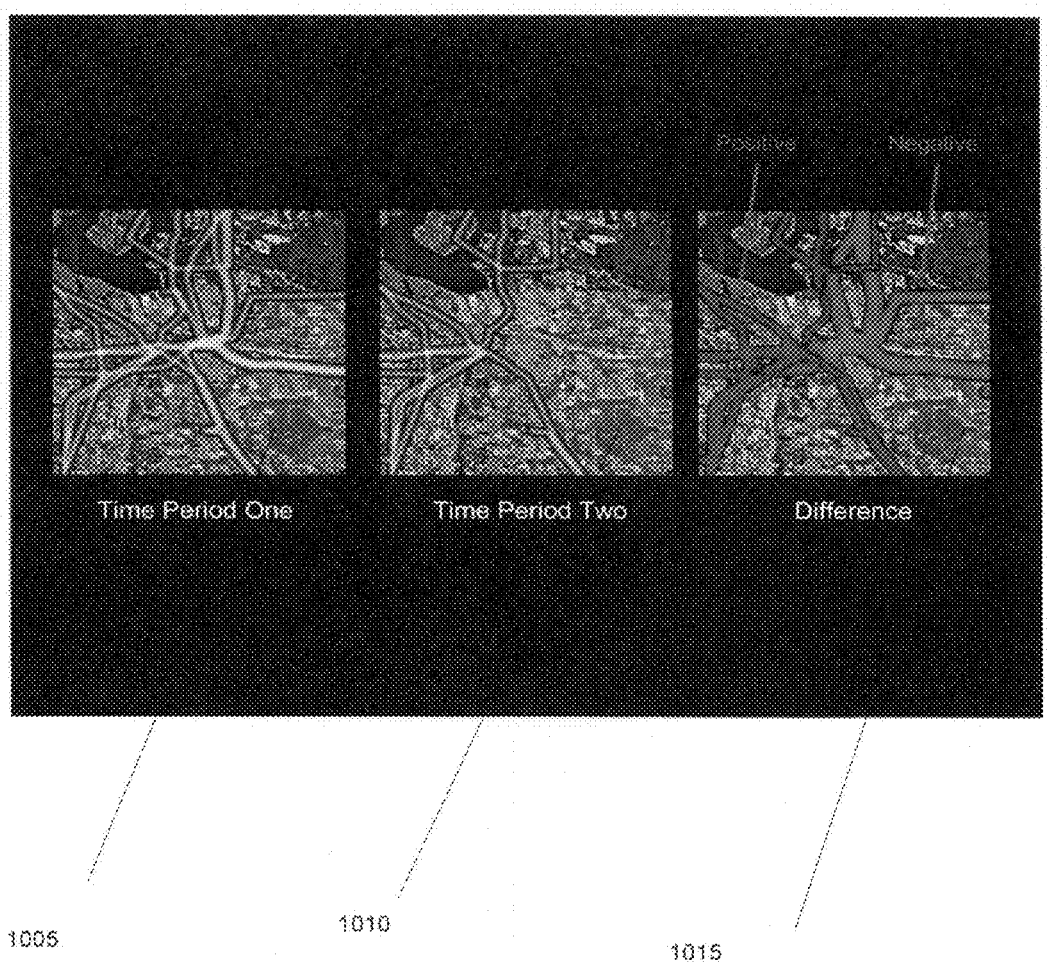
Figure 14:
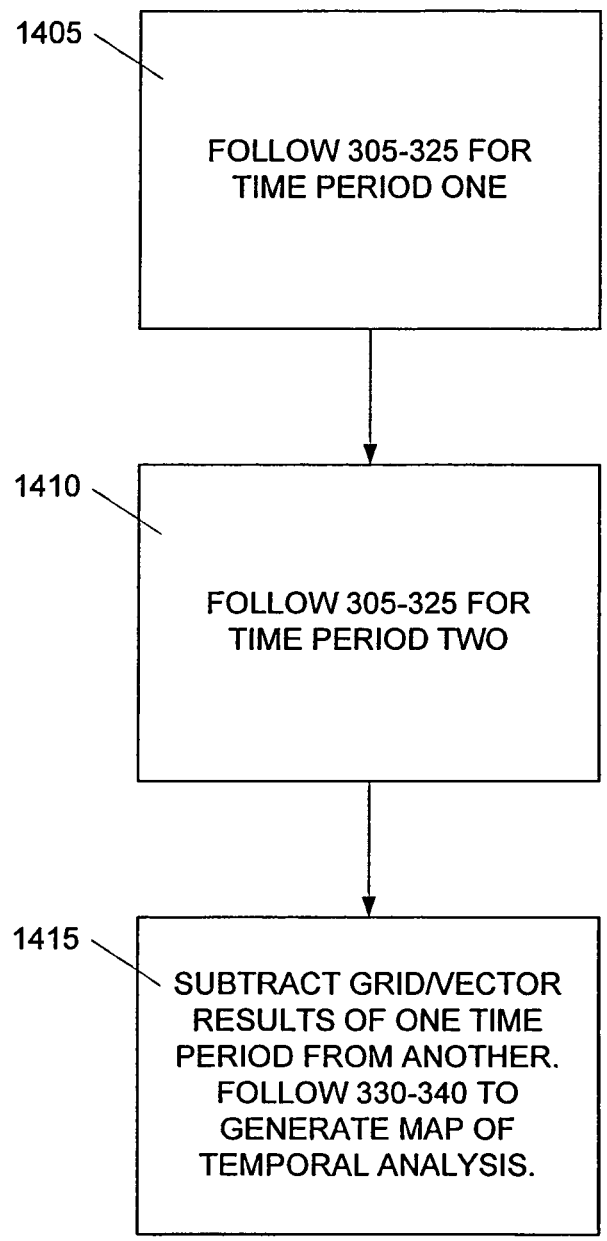

FIGS. 9, 10 and 14 illustrates data that changes in a temporal fashion. The attributed features of a geometry or set of geometries can have a temporal data aspect to it such as a date or time stamp. Using the generic XML style example previously cited temporal data could follow the following form:

```
<Schema name="City" parent="Placemark">
<SimpleField name="Name" type="string" />
<SimpleField name="Population 1900" type="int" />
<SimpleField name="Population 1920" type="int" />
<SimpleField name="Population 1940" type="int" />
<SimpleField name="Population 1960" type="int" />
<SimpleField name="Population 1980" type="int" />
<SimpleField name="Population 2000" type="int" />
</Schema>
<City>
<Name>Nowheretown</Name>
<Population>300</Population>
<Population>400</Population>
<Population>500</Population>
<Population>600</Population>
<Population>700</Population>
<Population>800</Population>
</City>
```

From the user interface side the data would have the following visual layout

| City Name | Population 1900 | Population 1920 | Population 1940 | Population 1960 | Population 1980 | Population 2000 |
|---|---|---|---|---|---|---|
| Nowheretown Enter Location | 300 Enter Attribute | 400 | 500 | 600 | 700 | 800 |

Now that the system has a set of a series of temporal data points the map can visualize the change over time either as a series of static maps (e.g., FIG. 9) or a map showing the difference (e.g., FIG. 10). If a series of maps are created, the maps can be animated, for example, sequenced as a timed animation using any number of standard methods. The dynamic heat mapping approach can also be used to re-render heat maps on the fly as real time data changes or is dynamically updated. FIG. 9 illustrates the changing heat map of real time pipeline flows at three different time periods, according to one embodiment. For each map (e.g., one, two, or three), the method illustrated in FIG. 3 is followed using the data points for the particular time period (e.g., one, two or three) as the vector data source 310.

In addition to dynamically visualizing real time data flows, the approach can also provide temporal analytics for change over time. For instance, did a certain geography or asset increase or decrease between the two time periods. FIG. 10 is a map illustrating map 1015, which is the difference in flow between two time periods (map 1005 representing pipeline flow of time period one, and map 1010 representing pipeline flow of time period two). For map 1015, geographies that gained flow (e.g., there was an increase in pipeline use) can be illustrated in one color (such as green) and those that lost flow (e.g., there was a decrease in pipeline flow) can be illustrated in another color (such as red). Map 1005 is time period one, map 1010 is time period two, and map 1015 is the difference between map one 1005 and map two 1010. FIG. 14 is a method illustrating how map 1015 is generated, according to one embodiment. In 1405, 305-325 of the method illustrated in FIG. 3 are followed, using the data points for time period one as the vector data source 310. In 1410, 305-325 of the method illustrated in FIG. 3 are followed, using the data points for time period two as the vector data source 310. In 1415, the grid/vector results of 325 for time period one is subtracted from the grid/vector results of 325 for time period two. The map 1015 for the temporal analysis can then be created by following 330-340 of the method illustrated in FIG. 3.

Figure 11:
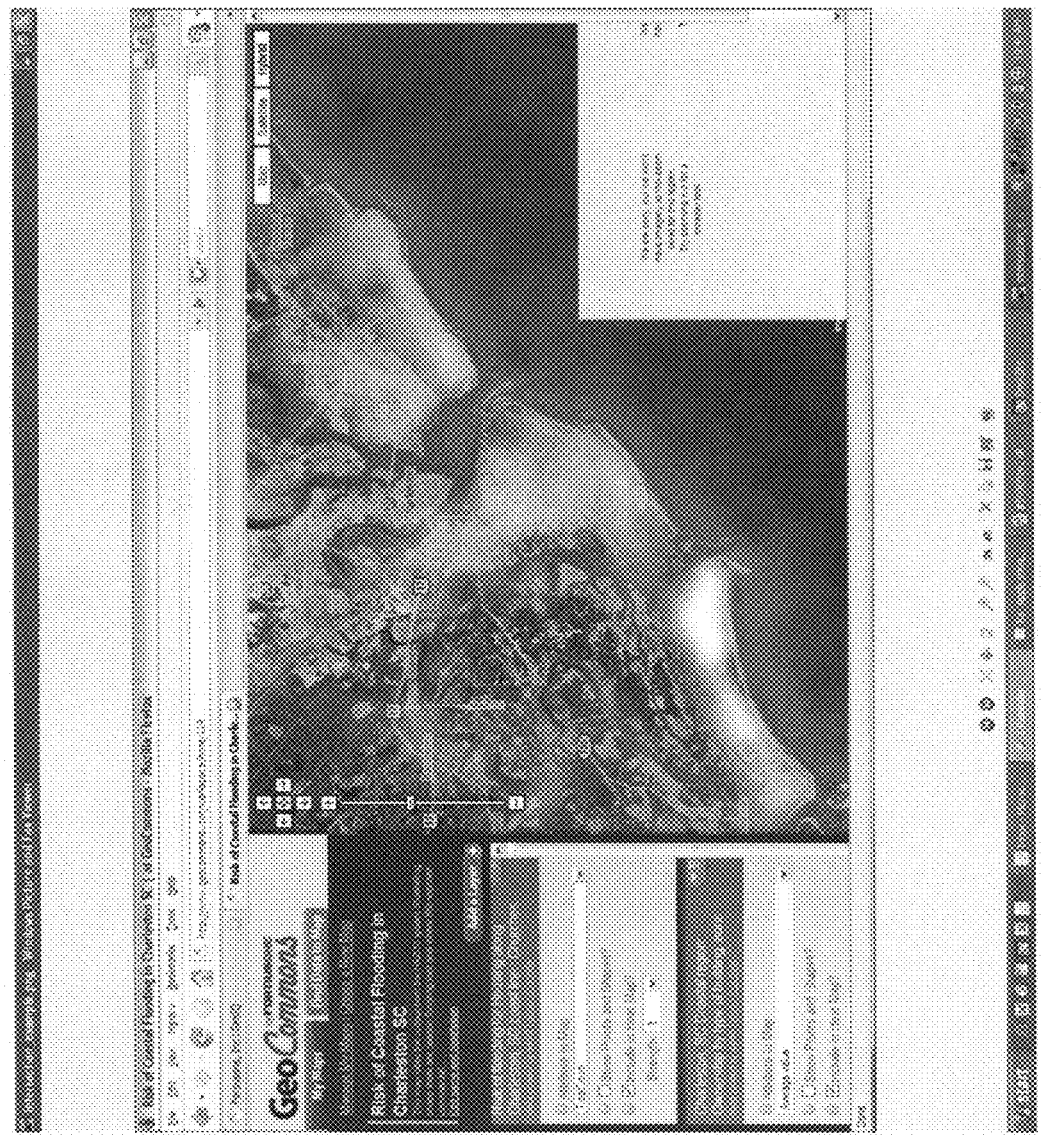
Figure 15:
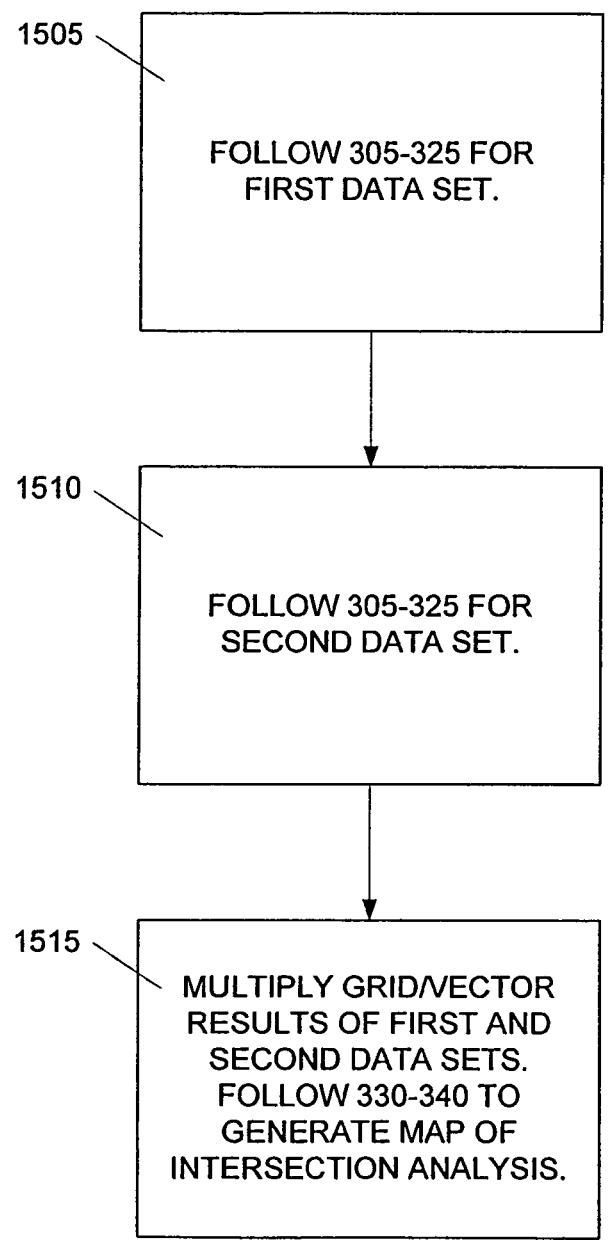

Another example of analysis that can be applied is illustrated in FIGS. 11 and 15, which illustrate the intersection of data, according to one embodiment. For example, if two or more images for two or more different data sets (weighted or unweighted by an attribute) are added, the results could be an image illustrating where those two data sets intersected each other and the color would indicate the proximity and magnitude (if weighted by an attribute) of those two or more data sets. FIG. 11 illustrates intersection map 1115. For example, map 1115 could illustrate areas where pipelines and possible earthquake locations intersect, thus illustrating areas of possible flooding. FIG. 15 is a method illustrating how map 1115 is generated, according to one embodiment. In 1505, the grid/vector result for the first data set can be created by following 305-325 of the method illustrated in FIG. 3, and using the data points for the first data set as the vector data source 310. In 1510, the grid/vector result for the second data set can be created by following 305-325 of the method illustrated in FIG. 3, and using the data points for the second data set as the vector data source 310. In 1515, map 1115 for the intersection can be created by multiplying the grid/vector result of for the first data set by the grid/vector result of the second data set. The map 1115 for the intersection analysis can then be created by following 330-340 of the method illustrated in FIG. 3.

Figure 12:
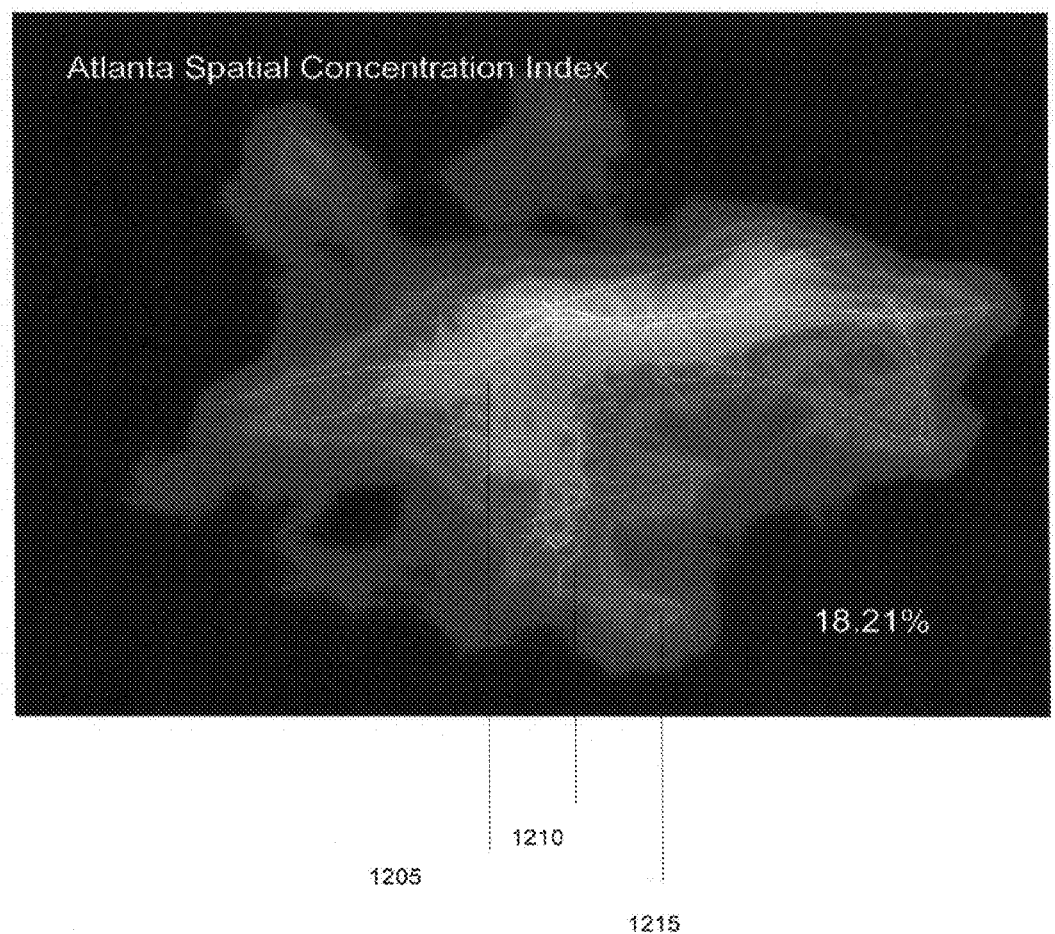
Figure 16:
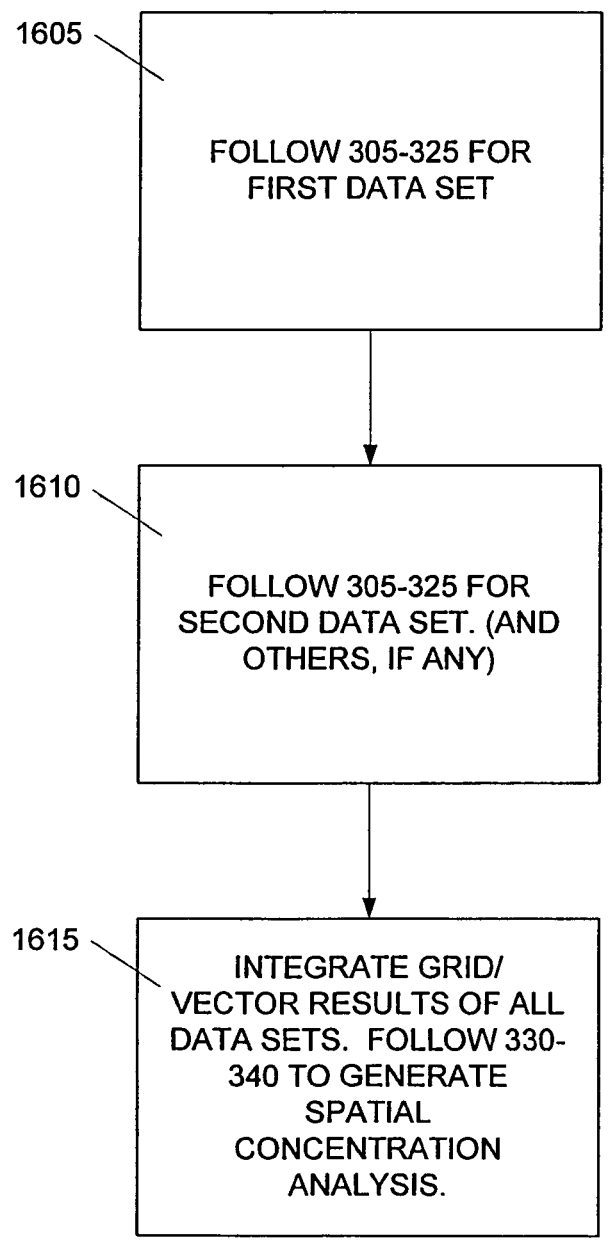

FIGS. 12 and 16 illustrate a spatial concentration index (SCI) analysis, according to one embodiment. FIG. 12 is an example of a spatial concentration index (SCI) for a city for five attributed infrastructures (electric power, natural gas, crude oil, refined products, and telecommunications). The SCI calculates the geographic concentration of any number of attributed data by measuring the geographic space separating the various assets and weighting it by the appropriate attribute. In 1605, 305-325 of FIG. 3 is followed for each attribute data set. In 1615, the grid/vector results of 325 for each attribute data set are integrated together. Then 330-340 of FIG. 3 are applied to the result in order to map the SCI. Thus, based on the calculation of distances between attributed data and what the values of those attributes are, a concentration index can be calculated. If all the attributed data in the study space are directly on top of each other the index would be 100. If no attributed data is in the study space the index would be 0, and various distributions of attributed data will results in varying indexes based on the concentration of the attributed data. FIG. 12 illustrates an SCI of 18.21. Note that one color 1205 (such as yellow) could illustrate the most concentrated area, another color 1215 (such as purple) could illustrate the least concentrated area, and varying distributions 1210 between the two colors could be illustrated by other colors.

The SCI can also integrate the real time data analytics discussed above. For instance the SCI could be determined in real time based on the actual flows though the infrastructure. Also, a risk index could be calculated based on real time hazard data like wind speed or storm surge from an approaching hurricane. As the threat ebbs and flows in magnitude or direction the SCI would dynamically recalculate to indicate the risk exposure as the real time threat evolves.

The SCI approach is not confined to calculating only risk parameters, but can also be used on a wide variety geospatial data providing geo-analytic decision support across a number of verticals. Consumers can hook in local searches, such as Yahoo Local and Google Local, and determine which location has a higher SCI of businesses they find attractive. This data can then be mashed up with demographic information to provide geo-analytics to support consumer and business decisions. For instance does neighborhood "A" or neighborhood "B" have a high concentration of young singles and highly rated bars? From the business perspective does neighborhood "A" or neighborhood "B" have a low concentration of competing coffee shops and a high concentration of individuals making over $100,000 per year?

Figure 13:
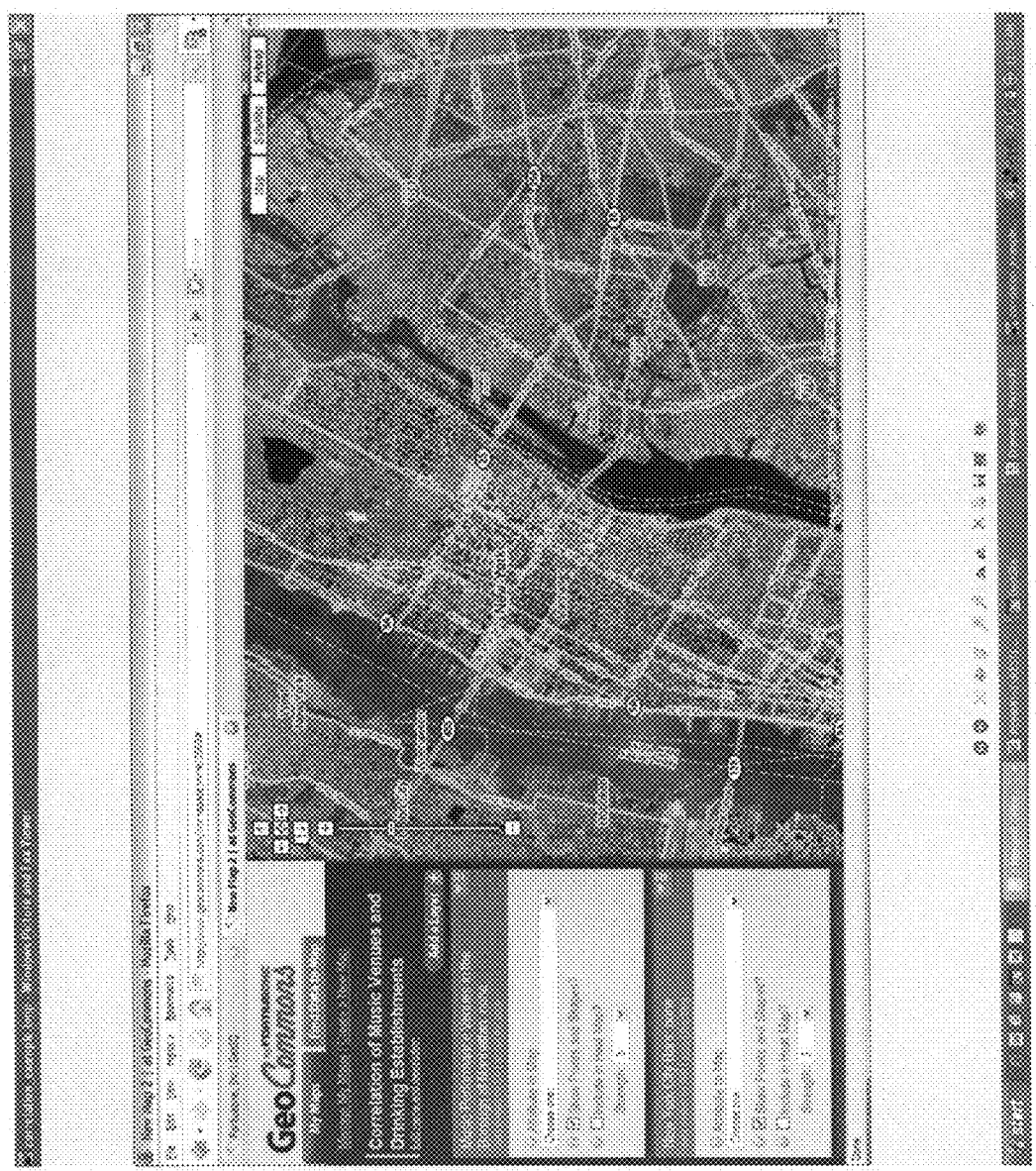
Figure 17:
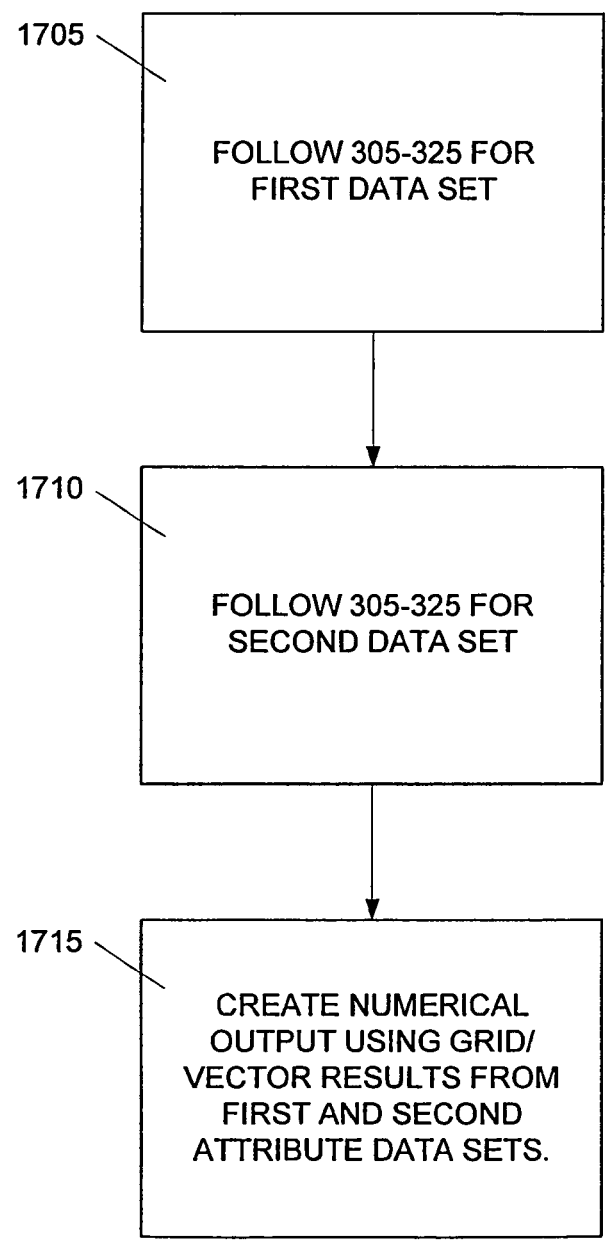

FIGS. 13 and 17 illustrate a correlation analysis, according to one embodiment. Suppose there are two or more sets of sufficiently overlapping geometries, each ranked by a different attribute. It is possible to compute a score that measures how related those attributes are, for the area in question. For example, if a data set was loaded with 25 store locations and second data set was loaded with the location of households who make over $100,000, an analysis could be run to see what the spatial correlation was between the stores and people who make over $100,000.

To compute the correlation score (note that a numerical output and not a map output is provided in the correlation analysis), in 1705, 305-325 of FIG. 3 are followed for the data set for the first attribute. In 1710, 305-325 of FIG. 3 are followed for the data set for the second attribute. In 1715, a numerical output is created using the grid/vector results of the first and second attributes. At this point, we can compute a score by using the traditional linear correlation coefficient:

$$r = \frac{1}{n-1} \sum \left( \frac{x_i - <x>}{s_x} \right) \left( \frac{y_i - <y>}{s_y} \right)$$

In the above equation, in one embodiment, two data sets, X and Y, are compared. X includes a set of values $x_i$, i=1 to n. Similarly Y includes a set of values $y_i$, i=1 to n. The values $<x>$ and $<y>$ represent the average value from the data sets X and Y, respectively. The value $s_x$ and $s_y$ represent the standard deviation of the data sets X and Y, respectively. The correlation coefficient r can thus be used to see to what degree the two (or more) attributes are partially correlated. Thus, FIG. 13 illustrates a map of locations that can represent both a map of attribute one (e.g., where music venue stores are located, which can be illustrated using one dot color, such as red) and a map of attribute two (where drinking establishments are located, which can be illustrated using another dot color, such as green). The correlation index can be calculated to be a value such as 33.7.

CONCLUSION

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments. As another example, more than two data sets could be used in each analysis.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A computerized method for providing mapping, data management and analysis, comprising:
    receiving at a server a user request for creation of a map with a desired Gaussian aggregation and desired color map parameters;
    loading vector geographic data at the server comprising location data, the location data comprising at least one attribute;
    rasterizing the vector geographic data to create image data composed of pixels;
    converting the image data to a certain scale grayscale image data;
    performing a convolution operation on the grayscale image data to provide an aggregation of the data using a kernel radius wherein the kernel radius is adjusted in accordance with the desired zoom level;
    applying convolution results to a color ramp;
    creating the map for the location data based on the color ramp and the convolution results; and
    providing the map to the user.

2. The method of claim 1, wherein an additional mathematical operation is performed to analyze the data.

3. The method of claim 2, wherein the mathematical operation is:
    addition/integration;
    subtraction;
    multiplication; or
    a linear correlation; or
    any combination thereof.

4. The method of claim 3, further comprising employing the multiplication to perform an intersection analysis.

5. The method of claim 3, further comprising employing the subtraction to perform a temporal analysis.

6. The method of claim 3, further comprising employing the addition/integration to perform a special concentration analysis.

7. The method of claim 3, further comprising employing a linear correlation function to perform a correlation analysis.

8. The method of claim 1, further comprising delivering the map through a Web browser.

9. The method of claim 1, wherein the map is dynamically re-created as users zoom in and out or as temporal data feeds change.

10. The method of claim 1, wherein the method utilizes a bounding box and tiling technique to provide panning of raster analysis across the map.

11. The method of claim 1, wherein the data comprises user-generated vector data.

12. The method of claim 1, wherein the convolution is a Gaussian aggregation and the kernel radius is a Gaussian distance decay function.

13. The method of claim 1, wherein the data comprises user-generated vector data.

14. The method of claim 1, wherein the convolution operation is performed on the grayscale image data within the confines of a viewing boundary box around part of the grayscale image data in accordance with zoom and panning operations performed by the user.

15. The method of claim 14, wherein the viewing boundary box comprises a buffer around its periphery based on the kernel radius to produce an additional region of image around the viewing boundary box.

16. The method of claim 15, further comprising:
receiving a request from the user to pan the map; and
providing an updated map to the user including at least some of the image from the buffer.

17. A system for providing mapping, data management and analysis, comprising:
a processing device comprising a server coupled to a network;
a database accessible by the server; and
an application coupled to the server, the application configured to:
receive at a server a user request for creation of a map with a desired Gaussian aggregation and desired color map parameters;
load vector geographic data at the server comprising location data, the location data comprising at least one attribute;
rasterize the vector geographic data to create image data composed of pixels;
converting the image data to a certain scale grayscale image data;
perform a convolution operation on the grayscale image data to provide an aggregation of the data using a kernel radius wherein the kernel radius is adjusted in accordance with the desired zoom level;
apply convolution results to a color ramp;
create the map for the location data based on the color ramp and the convolution results; and
providing the map to the user.

18. The system of claim 17, wherein the application is further configured to perform an additional mathematical operation to analyze the data.

19. The system of claim 18, wherein the mathematical operation is:
addition/integration;
subtraction;
multiplication; or
a linear correlation; or
any combination thereof.

20. The system of claim 19, wherein the application is further configured to employ the multiplication to perform an intersection analysis.

21. The system of claim 19, wherein the application is further configured to employ the subtraction to perform a temporal analysis.

22. The system of claim 19, wherein the application is further configured to employ the addition/integration to perform a special concentration analysis.

23. The system of claim 19, wherein the application is further configured to employ a linear correlation function to perform a correlation analysis.

24. The system of claim 17, wherein the application is further configured to deliver the map through a Web browser.

25. The system of claim 17, wherein the map is dynamically re-created as users zoom in and out or as temporal data feeds change.

26. The system of claim 17, wherein the application utilizes a bounding box and tiling technique to provide panning of raster analysis across the map.

27. The system of claim 17, wherein the data comprises user-generated vector data.

28. The system of claim 17, wherein the convolution is a Gaussian aggregation and the kernel radius is a Gaussian distance decay function.

29. The system of claim 17, wherein the data comprises user-generated vector data.

30. The system of claim 17, wherein the convolution operation is performed on the grayscale image data within the confines of a viewing boundary box around part of the grayscale image data in accordance with zoom and panning operations performed by the user.

31. The system of claim 30, wherein the viewing boundary box comprises a buffer around its periphery based on the kernel radius to produce an additional region of image around the viewing boundary box.

32. The system of claim 31, wherein the application is further configured to:
receive a request from the user to pan the map; and
provide an updated map to the user including at least some of the image from the buffer.

* * * * *